US012669600B2

(12) United States Patent
Ghosh et al.

(10) Patent No.: US 12,669,600 B2
(45) Date of Patent: Jun. 30, 2026

(54) RADAR SYSTEMS AND METHOD FOR BACKING A TRAILER

(71) Applicant: Outrider Technologies, Inc., Golden, CO (US)

(72) Inventors: Ashutosh Ghosh, Golden, CO (US); Michael Cutter, Golden, CO (US); Lawrence Klein, Bend, OR (US); Walter Jason Altice, Denver, CO (US); Devin Jaenicke, Lakewood, CO (US)

(73) Assignee: Outrider Technologies, Inc., Henderson, CO (US)

( * ) Notice: Subject to any disclaimer, the term of this patent is extended or adjusted under 35 U.S.C. 154(b) by 439 days.

(21) Appl. No.: 18/081,033

(22) Filed: Dec. 14, 2022

(65) Prior Publication Data

US 2023/0184933 A1    Jun. 15, 2023

Related U.S. Application Data

(60) Provisional application No. 63/289,610, filed on Dec. 14, 2021.

(51) Int. Cl.
  *G01S 13/931*    (2020.01)
  *B60W 30/06*    (2006.01)
      (Continued)

(52) U.S. Cl.
  CPC ........... *G01S 13/931* (2013.01); *B60W 30/06* (2013.01); *B60W 30/0956* (2013.01);
      (Continued)

(58) Field of Classification Search
  None
  See application file for complete search history.

(56) References Cited

U.S. PATENT DOCUMENTS

| 11,173,883 B2 * | 11/2021 | Nemeth | .................... B60T 7/22 |
| 2018/0004221 A1 * | 1/2018 | Hazelton | .............. G05D 1/0257 |

(Continued)

FOREIGN PATENT DOCUMENTS

| CN | 113859147 | 12/2021 |
| EP | 3355293 A1 | 8/2018 |

(Continued)

OTHER PUBLICATIONS

International Patent Application No. PCT/US2022/052798 International Search Report and Written Opinion dated Jun. 26, 2023, 10 pages.

(Continued)

*Primary Examiner* — Olumide Ajibade Akonai
*Assistant Examiner* — Bongani Jabulani Mashele
(74) *Attorney, Agent, or Firm* — Cozen O'Connor

(57) ABSTRACT

A RADAR system and associated methods are used to detect obstacles obscured from view when backing a trailer. An autonomous tractor is equipped with a rear facing RADAR device that has a field-of-view under the trailer and is configured to output RADAR returns from reflections. A controller of the tractor classifies RADAR returns from the RADAR device according to a number of reflections by a dock wall and a trailer face (e.g., a back end of the trailer) of a corresponding RADAR beam. The RADAR returns are correlated based on distance, and distance of a RADAR return from an obstacle is corrected based on the number of reflections. Advantageously, by processing RADAR returns from both direct and reflected RADAR beams, the controller is able to detect obstacles hidden behind the trailer and flag the obstacles as a hazard.

20 Claims, 14 Drawing Sheets

(51) Int. Cl.

| | |
|---|---|
| *B60W 30/095* | (2012.01) |
| *B60W 60/00* | (2020.01) |
| *G01S 7/41* | (2006.01) |
| *G01S 13/86* | (2006.01) |

(52) U.S. Cl.
CPC ......... *B60W 60/0015* (2020.02); *G01S 7/412* (2013.01); *G01S 13/865* (2013.01); *G01S 13/867* (2013.01); *B60W 2300/145* (2013.01); *B60W 2420/403* (2013.01); *B60W 2420/408* (2024.01); *B60W 2420/54* (2013.01); *G01S 2013/9317* (2013.01); *G01S 2013/93272* (2020.01)

(56) References Cited

U.S. PATENT DOCUMENTS

| | | | |
|---|---|---|---|
| 2021/0142526 A1 * | 5/2021 | Mantyjarvi | B60W 50/14 |
| 2021/0405185 A1 * | 12/2021 | Price | G01S 13/931 |
| 2022/0342038 A1 * | 10/2022 | Armbruster | G01S 13/931 |

FOREIGN PATENT DOCUMENTS

| | | | |
|---|---|---|---|
| KR | 10-2247956 B1 | 5/2021 | |
| WO | WO-2019042958 A1 * | 3/2019 | B60D 1/62 |

OTHER PUBLICATIONS

Extended European Search Report for European Application No. 22908362.1 mailed Feb. 26, 2025, 8 pages.

\* cited by examiner

100

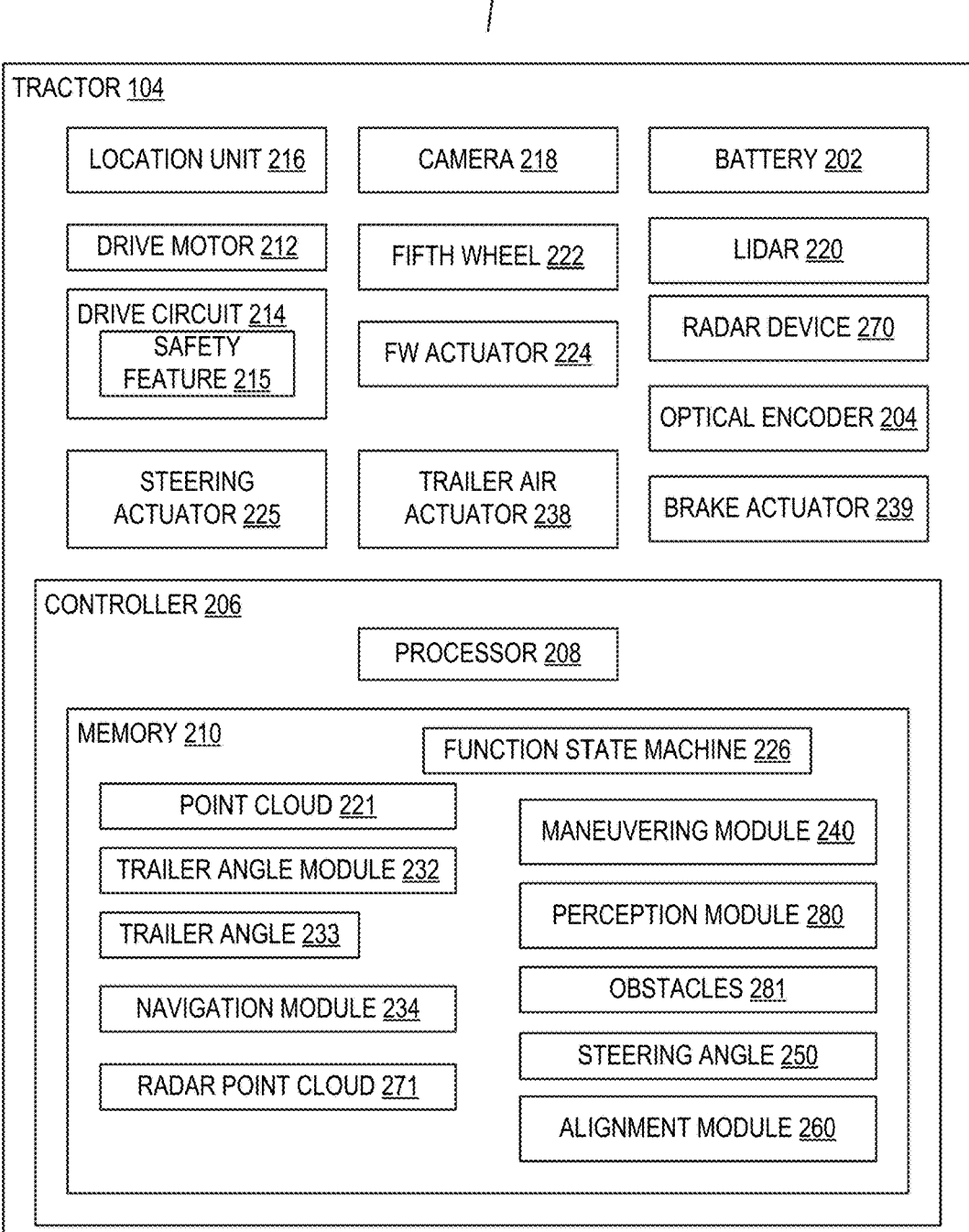

MISSION CONTROLLER 102

TRACTOR 104

LOCATION UNIT 216

CAMERA 218

BATTERY 202

DRIVE MOTOR 212

FIFTH WHEEL 222

LIDAR 220

DRIVE CIRCUIT 214

SAFETY FEATURE 215

FW ACTUATOR 224

RADAR DEVICE 270

OPTICAL ENCODER 204

STEERING ACTUATOR 225

TRAILER AIR ACTUATOR 238

BRAKE ACTUATOR 239

CONTROLLER 206

PROCESSOR 208

MEMORY 210

FUNCTION STATE MACHINE 226

POINT CLOUD 221

TRAILER ANGLE MODULE 232

TRAILER ANGLE 233

NAVIGATION MODULE 234

RADAR POINT CLOUD 271

MANEUVERING MODULE 240

PERCEPTION MODULE 280

OBSTACLES 281

STEERING ANGLE 250

ALIGNMENT MODULE 260

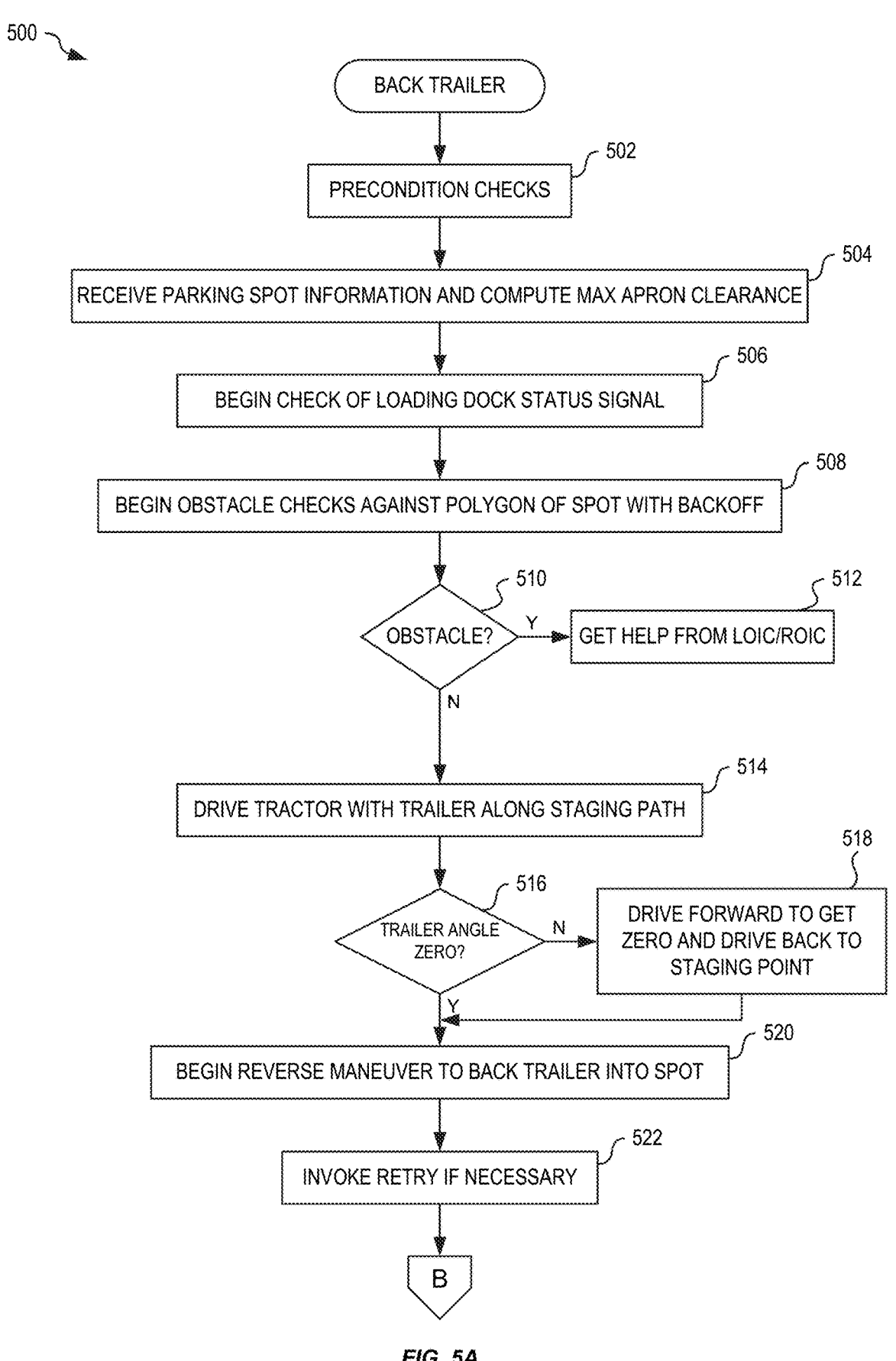

BACK TRAILER

502
PRECONDITION CHECKS

504
RECEIVE PARKING SPOT INFORMATION AND COMPUTE MAX APRON CLEARANCE

506
BEGIN CHECK OF LOADING DOCK STATUS SIGNAL

508
BEGIN OBSTACLE CHECKS AGAINST POLYGON OF SPOT WITH BACKOFF

510
OBSTACLE?

Y

512
GET HELP FROM LOIC/ROIC

N

514
DRIVE TRACTOR WITH TRAILER ALONG STAGING PATH

516
TRAILER ANGLE ZERO?

N

518
DRIVE FORWARD TO GET ZERO AND DRIVE BACK TO STAGING POINT

Y

520
BEGIN REVERSE MANEUVER TO BACK TRAILER INTO SPOT

522
INVOKE RETRY IF NECESSARY

ESTIMATE DOCK WALL AND TRAILER FACE

1004

CLASSIFY RADAR RETURNS ACCORDING TO NUMBER OF REFLECTIONS

1006

UPDATE CLASSIFICATIONS ACCORDING TO VELOCITY PROPERTY

1008

CORRECT POSITION OF RETURNS ACCORDING TO CLASSIFICATION

1010

FLAG OBSTACLES INFRINGING PLANNED MOTION OF THE TRAILER

*Fig. 11B*

1200

1202

TRANSMIT RADAR BENEATH TRAILER

1204

RECEIVE RETURN RADAR SIGNALS

1206

IDENTIFY ONE OR MORE OBSTACLES BASED ON THE RECEIVED RADAR SIGNALS

1208

INITIATE MANEUVER OF THE TRAILER WHEN THE RECEIVED RETURN SIGNALS INDICATE AN OBSTACLE IS LOCATED BEHIND THE TRAILER

RADAR SYSTEMS AND METHOD FOR BACKING A TRAILER

CROSS-REFERENCE TO RELATED APPLICATIONS

This application benefits from and claims priority to U.S. Provisional Patent Application Ser. No. 63/289,610, filed Dec. 14, 2021. The entire disclosure of the aforementioned application is incorporated by reference herein as if fully set forth.

BACKGROUND

Trucks are an essential part of modern commerce. These trucks transport materials and finished goods across the continent within their large interior spaces. Such goods are loaded and unloaded at various facilities that can include manufacturers, ports, distributors, retailers, and end users. The start and end locations are referred to as "yards" and include areas that trailers are parked (and/or staged) and moved to and from for access by tractors (trucks) for loading to a dock door for loading/unloading cargo into the associated facility, leaving the yard for travel to its destination, or entering the yard from its destination. Autonomous yard vehicle technology includes tractors (trucks) that are capable of automatically (without human intervention, or with human intervention via teleoperation) coupling, decoupling, and maneuvering trailers that are within the yard.

Safety is of upmost importance in such automated yards. The automatic maneuvering of said trailers results in situations where, if a person or other obstacle is in the intended path of the trailer or tractor, because there is no human operating the tractor, there are situations where the tractor may not know of a human or obstacle. Thus, additional sensors are desired so that the controller of the automated tractor can maneuver the trailers safely.

Additional difficulties arise because various manufacturers and freight companies have their own trailers. Thus, while an automated yard vehicle may have associated sensors, it is difficult to utilize sensors on the trailers themselves because it requires human (or machine) intervention on the trailer prior to maneuvering the trailer. This additional intervention step is timely and creates an additional location for safety concern.

SUMMARY

The present embodiments acknowledge the above-discussed disadvantages that an autonomous yard vehicle (tractor or truck) needs sufficient data to safely and efficiently operate maneuvers of a trailer around an automated yard. The present embodiments resolve the above-discussed disadvantages by providing a rear-facing radio detection and ranging (RADAR) system that is mounted on the autonomous yard vehicle and adapted with a field of view that scans under the coupled trailer, receives reflections of such scans, and uses techniques such as time of flight and phased array transmitter/receiver antennae to identify various reflections as obstacles, the trailer itself, or yard reference structures (such as walls, dock walls, yard structures/buildings, posts, etc.). The identified reflections are correlated to potential safety hazards and used by the automated yard vehicle's control system to maneuver the trailer to a desired position (e.g., by calculating the trailer angle via said reflections). Advantageously, the present embodiments purposefully desire to receive numerous multi-path reflections from the RADAR scan (whereas typical RADARs include various filters to remove multi-path RADAR signal reflections as noise). The numerous reflections allow the present embodiments to see around various obstacles associated with the trailer (e.g., the trailer wheels, etc.) where an obstacle may otherwise be hidden from view by the RADAR system.

In one embodiment, a system for backing a trailer includes: a RADAR device adapted to mount on a tractor with a field-of-view (FOV) rearward of the tractor such that, when the tractor is coupled to the trailer, the FOV is under the trailer, and a controller coupled to the radar device and operable to: control the RADAR device to transmit a plurality of transmitted signals within the FOV, receive, from the RADAR device, at least one return signal being at least one reflection of at least one of the plurality of transmitted signals and corresponding to an obstacle behind the trailer, the return signal defining a perceived location of the obstacle, and determine a correct location of the obstacle based on the perceived location and a number of reflections made by the return signal.

In another embodiment, a method for backing a trailer includes: estimating a dock wall and a trailer face, classifying RADAR return signals according to a number of reflections of a corresponding RADAR transmitted signal, updating classifications according to velocity property of the RADAR return signals, correcting position of the RADAR return signals according to the classification, and flagging obstacles positioned behind the trailer based upon the corrected position of the RADAR return signals.

In another embodiment, a method for maneuvering a trailer includes: transmitting a radio detection and ranging (RADAR) transmitted signal beneath the trailer; receiving return RADAR signals based on the transmitted signal; processing the return RADAR signals to identify at least one obstacle behind the trailer; and initiating a maneuver of the trailer when the return RADAR signals indicate an obstacle is located behind the trailer.

BRIEF DESCRIPTION OF THE FIGURES

FIG. 2 is a block diagram illustrating key functional components of the autonomous tractor of FIG. 1, in embodiments.

FIGS. 5A and 5B are flowcharts illustrating one example method for backing the trailer into the drop-off spot of FIG. 4, in embodiments.

FIG. 11B shows one example 2D representation of example RADAR returns detected by the RADAR device of FIG. 2 when an obstacle is location behind the trailer, in embodiments.

DETAILED DESCRIPTION OF THE EMBODIMENTS

In an automated yard, an autonomous tractor moves trailers between staging areas and loading docks for unloading and/or loading. The autonomous tractor repeatedly couples (hitches) to a trailer, moves the trailer, and then decouples (unhitches) from the trailer. During maneuvering of the trailer, particularly when backing, there exists a need to be able to "see" behind the trailer to prevent safety hazard issues when persons or obstacles are behind the trailer. Sensors located on the trailer, as opposed to the tractor, are inefficient and ineffective because they require intervention with the trailer prior to autonomous maneuvering. Visual (camera-based) sensors located on the autonomous yard vehicle are ineffective and inefficient because the field of view is blocked from the trailer itself. Moreover, attempts to visually view under the trailer are still blocked by the trailer wheels and other underneath components. Utilizing external sensors (such as cameras, motion sensors, and other sensor systems) external to the trailer (e.g., mounted on the wall, or via a drone) are also inefficient and ineffective because they require additional hardware mounted throughout the yard. Moreover, weather may prevent one or more of these external systems from operation.

Figure 1:
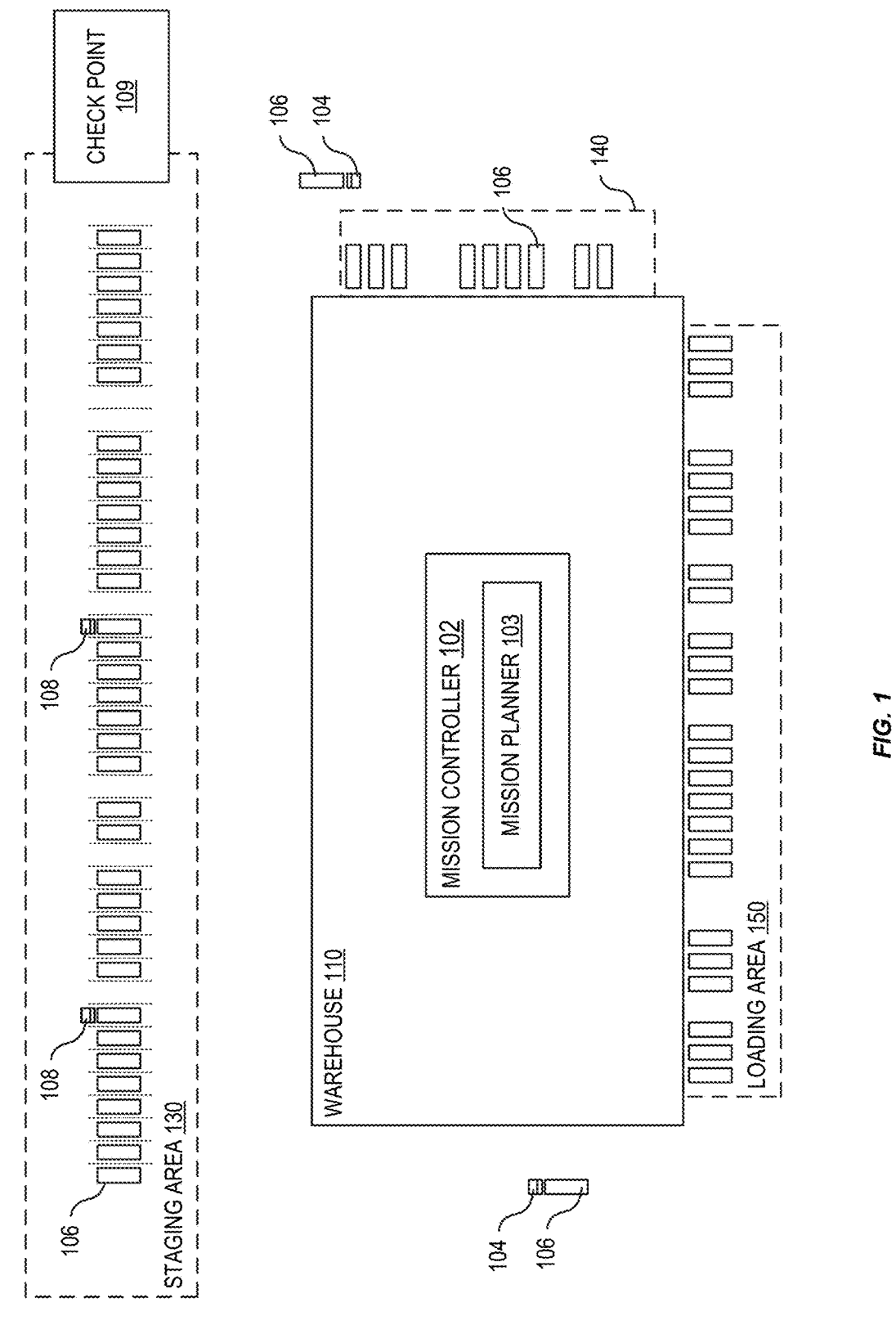
FIG. 1 is an aerial view showing one example autonomous yard that uses an autonomous tractor to move trailers between a staging area and loading docks of a warehouse, in embodiments.

FIG. 1 is an aerial view showing one example autonomous yard 100 (e.g., a goods handling facility, shipping facility, etc.) that uses an autonomous tractor 104 to move trailers 106 between a staging area 130 and loading docks of a warehouse 110. The autonomous tractor 104 may be an electric vehicle or may use a combustion-based engine such as a diesel tractor. For example, an over-the-road (OTR) tractors 108 deliver goods-laden trailers 106 from remote locations and retrieve trailers 106 for return to such locations (or elsewhere-such as a storage depot). In a standard operational procedure, OTR tractor 108 arrives with trailer 106 and checks-in at a facility entrance checkpoint 109. A guard/attendant enters information (e.g., trailer number or QR (ID) code scan-embedded information already in the system, which would typically include: trailer make/model/year/service connection location, etc.) into a mission controller 102 (e.g., a computer software server that may be located offsite, in the cloud, fully onsite, or partially located within a facility building complex, shown as a warehouse 110). Warehouse 110 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of OTR tractor 108 and trailer 106, the guard/attendant at checkpoint 109 directs the driver to deliver trailer 106 to a specific numbered parking space in a designated staging area 130, which may include a large array of side-by-side trailer parking locations, arranged as appropriate for the facility's overall layout.

Once the driver has parked the trailer in the designated parking space of the staging area 130, he/she disconnects the service lines and ensures that connectors are in an accessible position (i.e. if adjustable/sealable), and decouples OTR tractor 108 from trailer 106. If trailer 106 is equipped with swing doors, this can also provide an opportunity for the driver to unlatch and clip trailer doors in the open position, if directed by yard personnel to do so.

At some later time, (e.g., when warehouse is ready to process the loaded trailer) mission controller 102 directs (e.g., commands or otherwise controls) tractor 104 to automatically couple (e.g., hitch and, in some embodiments couple to air and/or electrical lines) with trailer 106 at a pick-up spot in staging area 130 and move trailer 106 to a drop-off spot at an assigned unloading dock in unloading area 140 for example. Accordingly, tractor 104 couples with trailer 106 at the pick-up spot, moves trailer 106 to unloading area 140, and then backs trailer 106 into the assigned loading dock at the drop-off spot such that the rear of trailer 106 is positioned in close proximity with the portal and cargo doors of warehouse 110. The pick-up spot and drop-off spot may be any designated trailer parking location in staging area 130, any loading dock in unloading area 140, and any loading dock within loading area 150.

Manual and/or automated techniques are used to offload the cargo from trailer 106 and into warehouse 110. During unloading, tractor 104 may remain hitched to trailer 106 or may decouple (e.g., unhitch) to perform other tasks. After unloading, mission controller 102 directs tractor 104 to move trailer 106 from a pick-up spot in unloading area 140 and to a drop-off spot, either returning trailer 106 to staging area 130 or delivering trailer 106 to an assigned loading dock in a loading area 150 of warehouse 110, where trailer 106 is then loaded. Once loaded, mission controller 102 directs tractor 104 to move trailer 106 from a pick-up spot in loading area 150 to a drop-off spot in staging area 130 where it may await collection by another (or the same) OTR tractor 108. Given the pick-up spot and the drop-off spot, tractor 104 may autonomously move trailer 106.

FIG. 2 is a block diagram illustrating key functional components of tractor 104. Tractor 104 includes a battery 202 for powering components of tractor 104 and a controller 206 with at least one digital processor 208 communicatively coupled with memory 210 that may include one or both of volatile memory (e.g., RAM, SRAM, etc.) and non-volatile memory (e.g., PROM, FLASH, Magnetic, Optical, etc.). Memory 210 stores a plurality of software modules including machine-readable instructions that, when executed by the at least one processor 208, cause the at least one processor 208 to implement functionality of tractor 104 as described herein to operate autonomously within autonomous yard 100 under direction from mission controller 102.

Tractor 104 also includes at least one drive motor 212 controlled by a drive circuit 214 to mechanically drive a plurality of wheels (not shown) to maneuver tractor 104. Drive circuit 214 includes a safety feature 215 that deactivates motion of tractor 104 when it detects that rotation of drive motor 212 is impeded (e.g., stalled) and that drive motor 212 is drawing a current at or greater than a stalled threshold (e.g., above one of 400 A, 500 A, 600 A, 700 A, etc. depending on the configuration of the drive motor 212), for a predetermined period (e.g., five seconds). Safety feature 215 may thereby prevent damage to tractor 104 and/or other objects around tractor 104 when tractor 104 is impeded by an object. Safety feature 215 is described above with respect to an electric tractor. It should be appreciated that a similar safety feature could be included for diesel-based or other types of tractors, such as reducing engine power when an RPM threshold goes above a pre-set threshold. When safety feature 215 is tripped, tractor 104 requires manual reactivation before being able to resume movement. Accordingly, tripping safety feature 215 is undesirable.

Tractor 104 also includes a location unit 216 (e.g., a GPS receiver) that determines an absolute location and orientation of tractor 104, a plurality of cameras 218 for capturing images of objects around tractor 104, and at least one Light Detection and Ranging (LIDAR) device 220 (hereinafter LIDAR 220) for determining a point cloud about tractor 104. Location unit 216, the plurality of cameras 218, and the at least one LIDAR 220 cooperate with controller 206 to enable autonomous maneuverability and safety of tractor 104. Tractor 104 includes a fifth wheel (FW) 222 for coupling with trailer 106 and a FW actuator 224 controlled by controller 206 to position FW 222 at a desired height. In certain embodiments, FW actuator 224 includes an electric motor coupled with a hydraulic pump that drives a hydraulic piston that moves FW 222. However, FW actuator 224 may include other devices for positioning FW 222 without departing from the scope hereof. Tractor 104 may also include an air actuator 238 that controls air supplied to trailer 106 and a brake actuator 239 that controls brakes of tractor 104 and trailer 106 when connected thereto via air actuator 238.

Controller 206 also includes a trailer angle module 232 that determines a trailer angle 233 between tractor 104 and trailer 106 based on one or both of a trailer angle measured by an optical encoder 204 positioned near FW 222 and mechanically coupled with trailer 106 and a point cloud 221 captured by the at least one LIDAR 220.

Tractor 104 also includes an alignment module 260 that provides improved localized alignment of tractor 104 such as when at a loading/unloading dock in unloading area 140 and loading area 150.

Controller 206 may implement a function state machine 226 that controls operation of tractor 104 based upon commands (requests) received from mission controller 102. For example, mission controller 102 may receive a request (e.g., via an API, and/or via a GUI used by a dispatch operator, or via a mission planning algorithm that manages actions to be taken by the tractor) to move trailer 106 from a first location (e.g., slot X in staging area 130) to a second location (e.g., loading dock Y in unloading area 140). Once this request is validated, mission controller 102 invokes a mission planner 103 (e.g., a software package) that computes a 'mission plan' (e.g., see mission plan 320, FIG. 3) for each tractor 104. For example, the mission plan is an ordered sequence of high level primitives to be followed by tractor 104, in order to move trailer 106 from location X to location Y. The mission plan may include primitives such as drive along a first route, couple with trailer 106 in parking location X, drive along a second route, back trailer 106 into a loading dock, and decouple from trailer 106.

Function state machine 226 includes a plurality of states, each associated with at least one software routine (e.g., machine-readable instructions) that is executed by processor 208 to implements a particular function of tractor 104. Function state machine 226 may transition through one or more states when following the primitives from mission controller 102 to complete the mission plan.

Controller 206 may also include an articulated maneuvering module 240, implemented as machine-readable instructions that, when executed by processor 208, cause processor 208 to control drive circuit 214 and steering actuator 225 to maneuver tractor 104 based on directives from mission controller 102.

Controller 206 may also include a navigation module 234 that uses location unit 216 to determine a current location and orientation of tractor 104. Navigation module 234 may also use other sensors (e.g., camera 218 and/or LIDAR 220) to determine the current location and orientation of tractor 104 using dead-reckoning techniques.

Tractor 104 may also include a rear facing radio detection and ranging (RADAR) device 270 and controller 206 may include a perception module 280, implemented as machine readable instructions stored in memory 210 and executable by processor 208, that processes returns from RADAR device 270 to detect and identify obstacles 281 behind trailer 106, particularly when tractor 104 is reversing trailer 106 into a parking spot and/or loading dock. Operation of RADAR device 270 and perception module 280 is described in further detail below.

Articulated Backing

Figure 3:
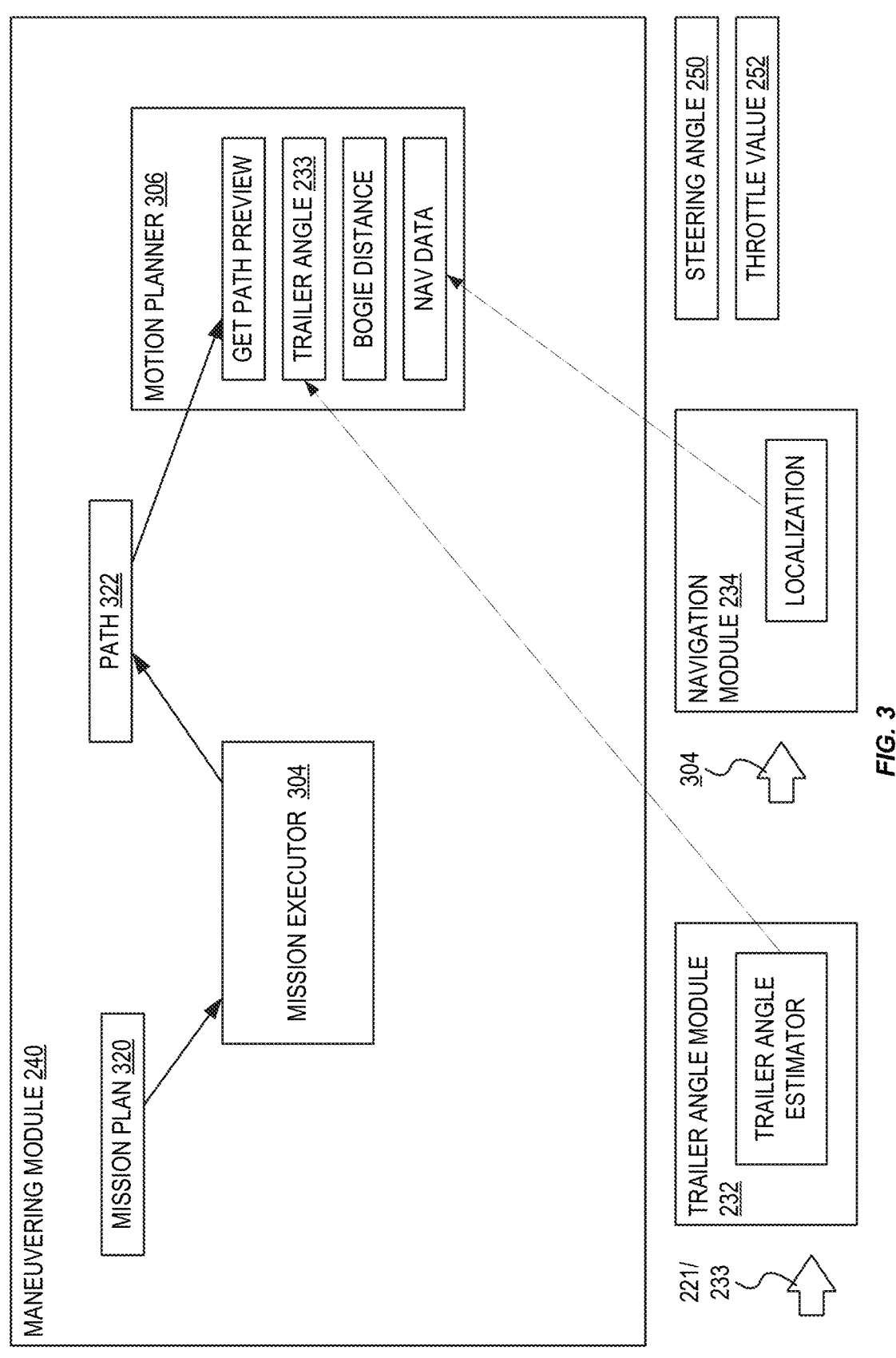
FIG. 3 shows the maneuvering module of the controller of FIG. 2 in further example detail, in embodiments.

FIG. 3 shows maneuvering module 240 of controller 206, FIG. 2, in further example detail. Maneuvering module 240 includes a mission executor 304 and a motion planner 306. Mission executor 304 may receive, from mission planner 103 running in mission controller 102, a mission plan 320 that defines an ordered list of mission segments, where each mission segment is a high-level primitive defining at least one activity to be performed by tractor 104. Mission executor 304 executes mission plan 320 by coordinating operation of one or more components of tractor 104. For example, mission executor 304 may define at least one path 322 that motion planner 306 controls tractor 104 to follow. For example, motion planner 306 may control steering angle 250 and throttle value 252 and use one or more inputs including trailer angle 233, and navigation data (e.g., a current location and orientation) from navigation module 234, and so on, to control tractor 104 to follow path 322. Accordingly, motion planner 306 causes tractor 104 to execute maneuvers and accomplish mission goals defined by mission plan 320. Examples of mission goals include achieving a given pose (e.g., location and orientation), follow a waypoint plan, and so on. These mission goals may be defined by mission plan 320 or may be generated, based on mission plan 320, by mission executor 304.

Figure 4:
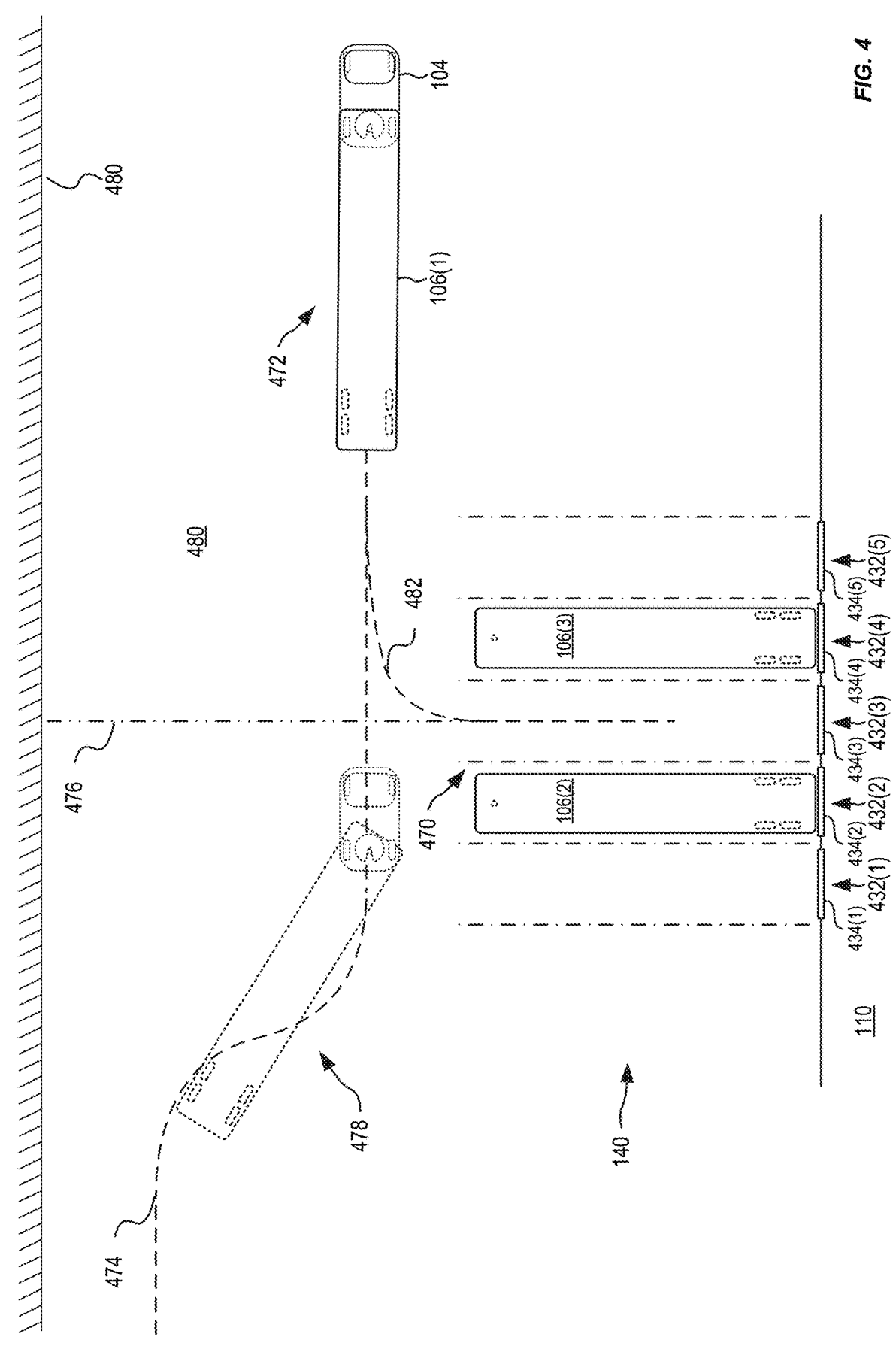
FIG. 4 is a schematic plan view illustrating one example mission for the tractor to deposit the trailer in a drop-off spot within unloading area of the autonomous yard of FIG. 1, in embodiments.

FIG. 4 is a schematic plan view illustrating one example mission for tractor 104 to deposit trailer 106 in a drop-off spot 470 (e.g., a loading dock 432) within unloading area 140 of autonomous yard 100 of FIG. 1. Tractor 104 positions trailer 106 in preparation for backing trailer 106 into a drop-off spot 470, which in this example is one of a plurality of loading docks 432 of unloading area 140 of warehouse 110. Each loading dock 432 has a loading door 434, with which the parked trailers align. In the Example of FIG. 4, no trailer is parked at drop-off spot 470, which corresponds to loading dock 432(3); however, loading docks 432(2) and 432(4), which are adjacent to loading dock 432(3), each have a parked trailer. Since trailer doors are at the rear of trailer 106, trailer 106 is reversed up to loading dock 432 and is correctly aligned with loading door 434 to provide full and safe access to trailer 106. A reference path 476, centered on drop-off spot 470 (e.g., loading dock 432(3)) may be determined by controller 206 to facilitate alignment of trailer 106 when backing into drop-off spot 470. Controller 206 may determine a staging path 474 for tractor 104 to follow to approach drop-off spot 470. Staging path 474 is determined based upon a starting orientation and location of tractor 104 and trailer 106 relative to drop-off spot 470 and is selected to position both tractor 104 and trailer 106 at the desired staging point 472, with the desired orientation, and with and angle of trailer 106 relative to tractor 104, substantially zero. As tractor 104, shown as outline 478, passes drop-off spot 470 while proceeding to staging point 472, tractor 104 may scan (e.g., using cameras 218 and/or LIDAR 220, drop-off spot 470 to determine that obstacles are not blocking maneuvering of trailer 106 into drop-off spot 470.

Trailer Backing Method

Figure 5B:
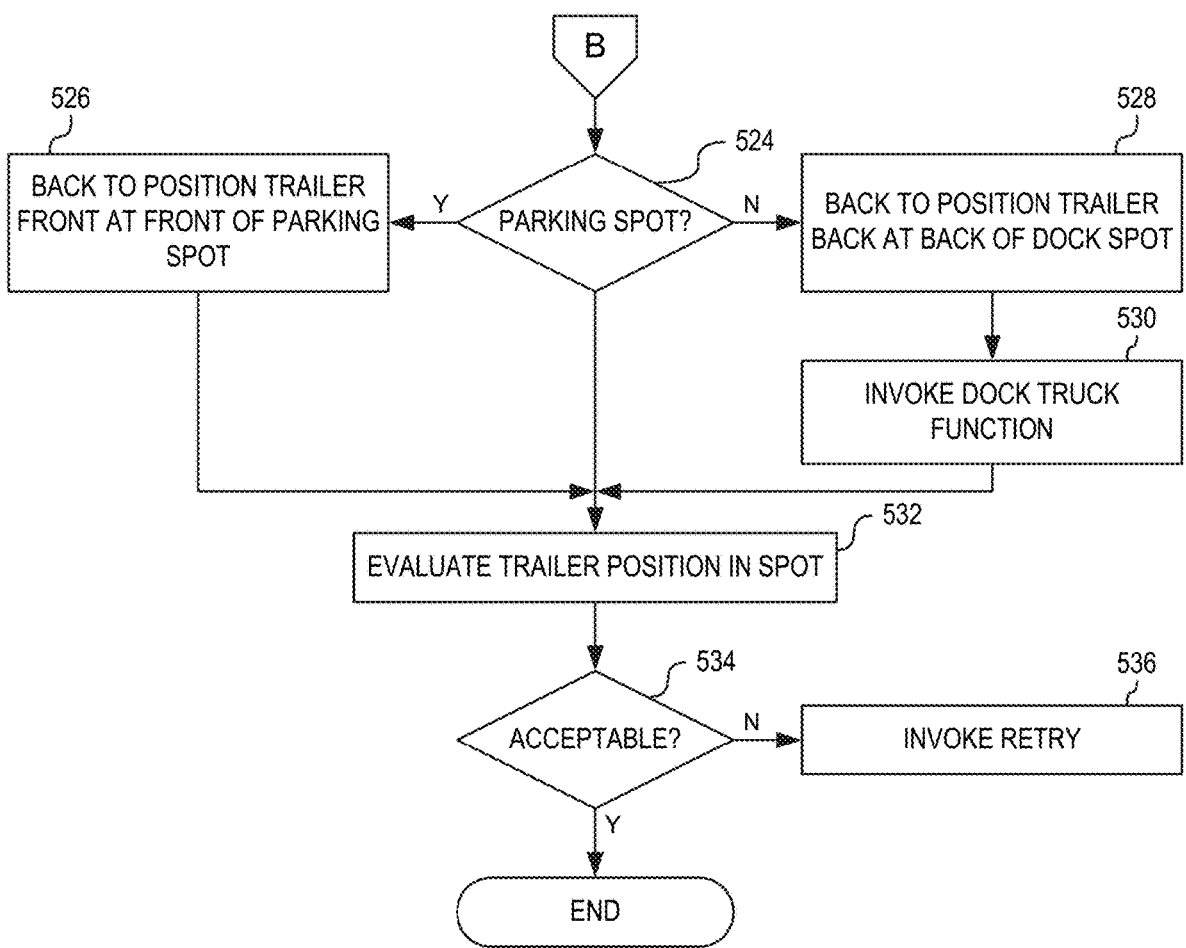

FIGS. 5A and 5B are flowcharts illustrating one example method 500 for backing trailer 106. For example, method 500 may be used to back trailer 106 into drop-off spot 470 of FIG. 4. The following example continues the mission, received from mission controller 102, to move trailer 106 from a pick-up spot (not shown) to drop-off spot 470. Method 500 is, for example, implemented at least in part by controller 206 of tractor 104 that executes computer readable instructions to cause tractor 104 to autonomously back trailer 106 into drop-off spot 470. In block 502, method 500 performs precondition checks. In one example of block 502, controller 206 checks that trailer 106 is attached to tractor 104 by verifying that FW 222 is locked and kingpin 308 is sensed within FW 222. In block 504, method 500 received drop-off spot information and computes maximum apron clearance. In one example of block 504, controller 206 uses location information of drop-off spot 470, received from mission controller 102, to compute freespace 480 near drop-off spot 470 by projecting lines radially from a front location of drop-off spot 470 to intersect with a line of any polygon defining structure (e.g., another trailer parking spot, a no-go area, an area boundary, a building, a wall, etc.) of autonomous yard 100.

Block 506 is only executed when drop-off spot 470 is a loading dock. In block 506, method 500 begins checking the loading dock status signal. In one example of block 506, controller 206 receives the loading dock status signal indicative of loading dock 432(3) at drop-off spot 470 being ready to receive trailer 106.

In block 508, method 500 begins obstacle checks against a polygon of drop-off spot with backoff. Any object detected within drop-off spot 470 may prevent trailer 106 from entering or being parked at drop-off spot 470. In one example of block 508, controller 206 uses LIDAR 220 to capture point cloud 221 of drop-off spot 470 and processes point cloud 221 to detect objects within drop-off spot 470, allowing for backoff of a small distance that ensures that trailer bumpers at a loading dock and a parking curb within staging area 130 are not detected as objects preventing parking of trailer 106. In certain embodiments, controller 206 may also use other sensors (e.g., cameras, SONAR, and/or RADAR) to capture data of drop-off spot 470 that may also, or alternatively, be used to detect objects within drop-off spot 470 that may prevent parking of trailer 106 therein.

Block 510 is a decision. If, in block 510, method 500 determines that an obstacle is present, method continues with block 512; otherwise, method 500 continues with block 514. In block 512, method 500 gets help from a remote operator or remote device.

In block 514, method 500 drives the tractor and the trailer forwards along a staging path. In one example of block 514, controller 206 controls tractor 104 to pull trailer 106 along staging path 474 that positions tractor 104 and trailer 106 for reversing into drop-off spot 470. Block 516 is a decision. If, in block 516, method 500 determines that the trailer angle is not within a predefines tolerance of zero, method 500 continues with block 518; otherwise, method 500 continues with block 520. In one example of block 516, while tractor 104 is stopped at staging point 472, controller 206 determines, based on trailer angle 233 being approximately zero, whether trailer 106 is aligned with tractor 104. In block 518, when the trailer angle is not close enough to zero and to correct the trailer angle, method 500 moves (e.g., called a "push-out" maneuver) tractor 104 forward in a straight line for a predefined distance, and then reverses tractor 104 and trailer 106 straight backwards to staging point 472. Staging path 474 is designed with a built-in push-out, but in certain circumstances, the built-in push-out is insufficient to straighten trailer 106. When backing trailer 106, it is advantageous to start the backing with a substantially zero trailer angle.

In block 520, method 500 begins the reversing maneuver to back the trailer into the drop-off spot. In one example of block 520, controller 206 controls tractor 104 to back trailer 106 along backing path 482 into drop-off spot 470. For example, controller 206 may control steering actuator 225 of tractor 104 to maneuver tractor 104 into freespace 480 as needed to reverse the back end of trailer 106 along backing path 482 and into drop-off spot 470 without trailer 106 or tractor 104 encroaching on other parking spaces or structures of autonomous yard 100. In block 522, method 500 invokes a retry if necessary. In one example of block 522, controller 206 detects that the current location of trailer 106 relative to backing path 482 exceeds a predefined tolerance and invokes a retry of the backing maneuver, whereby controller 206 controls tractor 104 to pull forward, along reference path 476 for example, to align with drop-off spot 470, and then reverses trailer 106 into drop-off spot 470, along reference path 476 for example.

Block 524 is a decision. If, in block 524, method 500 determines that the drop-off spot is a parking spot, method 500 continues with block 526; otherwise, method 500 continues with block 528. In block 526, method 500 backs to position the trailer front end at a front of the parking spot. In one example of block 526, controller 206 positions a front end of trailer 106 at a front of drop-off spot 470. For example, this positions the front of each trailer at the front of the parking spot irrespective of trailer length. Geometry of each parking spot is defined when autonomous yard 100 is commissioned, whereby each parking spot may be sized to accommodate all trailer lengths used within autonomous yard 100. Method 500 continues with block 532.

In block 528, method 500 backs to position the trailer back at the back of the drop-off spot. In one example of block 528, controller 206 backs trailer 106 into drop-off spot 470 such that the back end of trailer 106 is at the back end of drop-off spot 470. Since drop-off spot 470 is a loading dock (e.g., loading dock 432(3)), it is important that the back end of trailer 106 be immediately in front of loading door 434(3). In block 530, method 500 invokes a dock tractor function. In one example of block 530, controller 206 invokes a dock function that uses drive circuit 214 to applies throttle to push trailer 106 against bumpers of loading dock 432(3) to minimize rebound, and brakes of trailer are applied such that trailer 106 remains positioned directly in front of loading dock 432(3).

In block 532, method 500 evaluates whether the trailer is positioned within the drop-off spot acceptably. In one example of block 532, controller 206 uses one or more of location unit 216, trailer angle 233, known dimensions of trailer 106, camera 218, and LIDAR 220 to evaluate the position of trailer 106 within drop-off spot 470. Where drop-off spot 470 is a parking spot, controller 206 determines that trailer 106 is contained within the polygon defined for the parking spot. Where drop-off spot 470 is a loading dock, controller 206 evaluates whether an estimated position of the back end of trailer 106 is within a desired lateral accuracy of a center (e.g., a reference path 476) of loading dock 432(3).

Block 534 is a decision. If, in block 534, method 500 determines that the position of trailer is acceptable, method 500 terminates; otherwise, method 500 continues with block 536. In block 536, method 500 invokes a retry. In one example of block 536, controller 206 controls tractor 104 to pull trailer 106 straight ahead (e.g., along reference path 476) for a distance determined by freespace 480 (e.g., from apron clearance). At the end of this path, controller 206 control tractor 104 to back trailer 106 along reference path 476 into drop-off spot 470, repeating blocks 520 through 534 up to a maximum number of retries.

Figure 6:
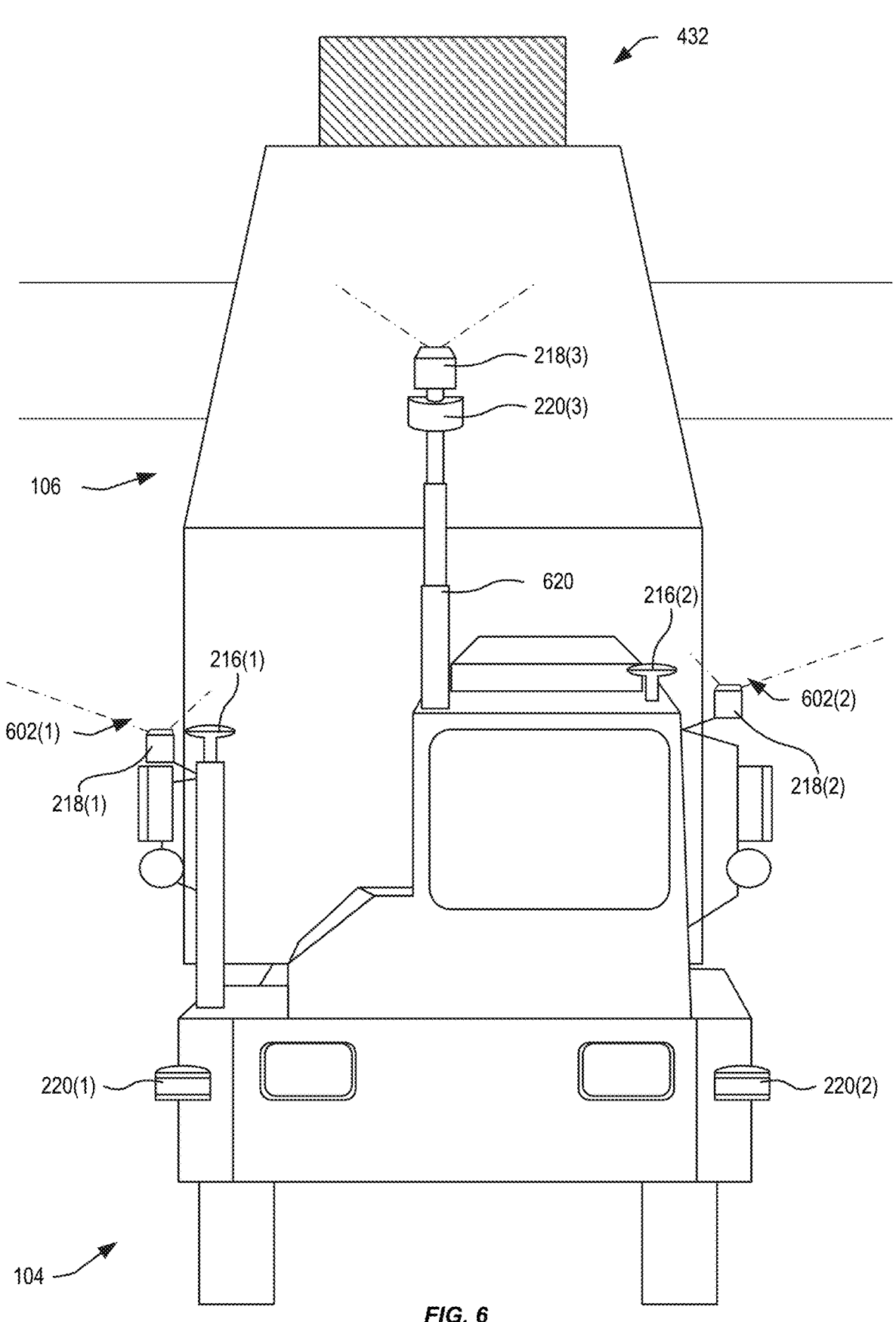
FIG. 6 is a schematic showing a restricted view from an autonomous tractor when reversing a trailer up to a loading dock, in embodiments.

FIG. 6 is a schematic showing a restricted view from autonomous tractor 104 when reversing trailer 106 up to loading dock 432. In this example, tractor 104 uses multiple rear facing cameras 218 and/or LIDAR 220 to assist with maneuvering, however, trailer 106 obscures any view tractor 104 has of an area immediately behind trailer 106. Although, as described above, many different safety procedures (e.g., drive by) may be implemented, when reversing, any object that moves into the area behind trailer 106 is not detected by tractor 104.

As shown in FIG. 6, tractor 104 has two rear-facing cameras 218(1)-(2), one positioned at each side of tractor 104, near wing mirrors for example, such that each has a rearward field of view 602 that includes a corresponding side of trailer 106. As tractor 104 is reversing trailer 106 into loading dock 432(3), controller 206 evaluates images captured by cameras 218, identifies any markings (e.g., fiducial markings, native objects) captured in the images, and computes a relative navigation solution for tractor 104 relative to the identified markings and their position within the images. Alignment module 260 uses the images and marking to improve location and orientation of tractor 104 relative to loading dock 432(3), as compared to location and orientation determined by location unit 216 from an inertial navigation system and/or odometry where drift errors may occur, and from availability of GPS signals where discontinuities and canyon effect errors may occur.

In certain embodiments, another camera 218(3) may be fitted to an extendable mast 620 coupled with tractor 104. As trailer 106 approaches loading dock 432, mast 620 may be extended to provide camera 218(3) with a higher vantage point that provides camera 218(3) with a view over trailer 106. However, even with mast 620, trailer 106 blocks a view of an area immediately behind trailer 106.

Conventionally, the location of the back end of trailer 106 is estimated based on trailer angle 233 and a current location and orientation of tractor 104. Advantageously, by determining the location of the back end of trailer 106 relative to loading dock 432, tractor 104 may more accurately position trailer 106 at loading dock 432.

Figures 7A, 7B:
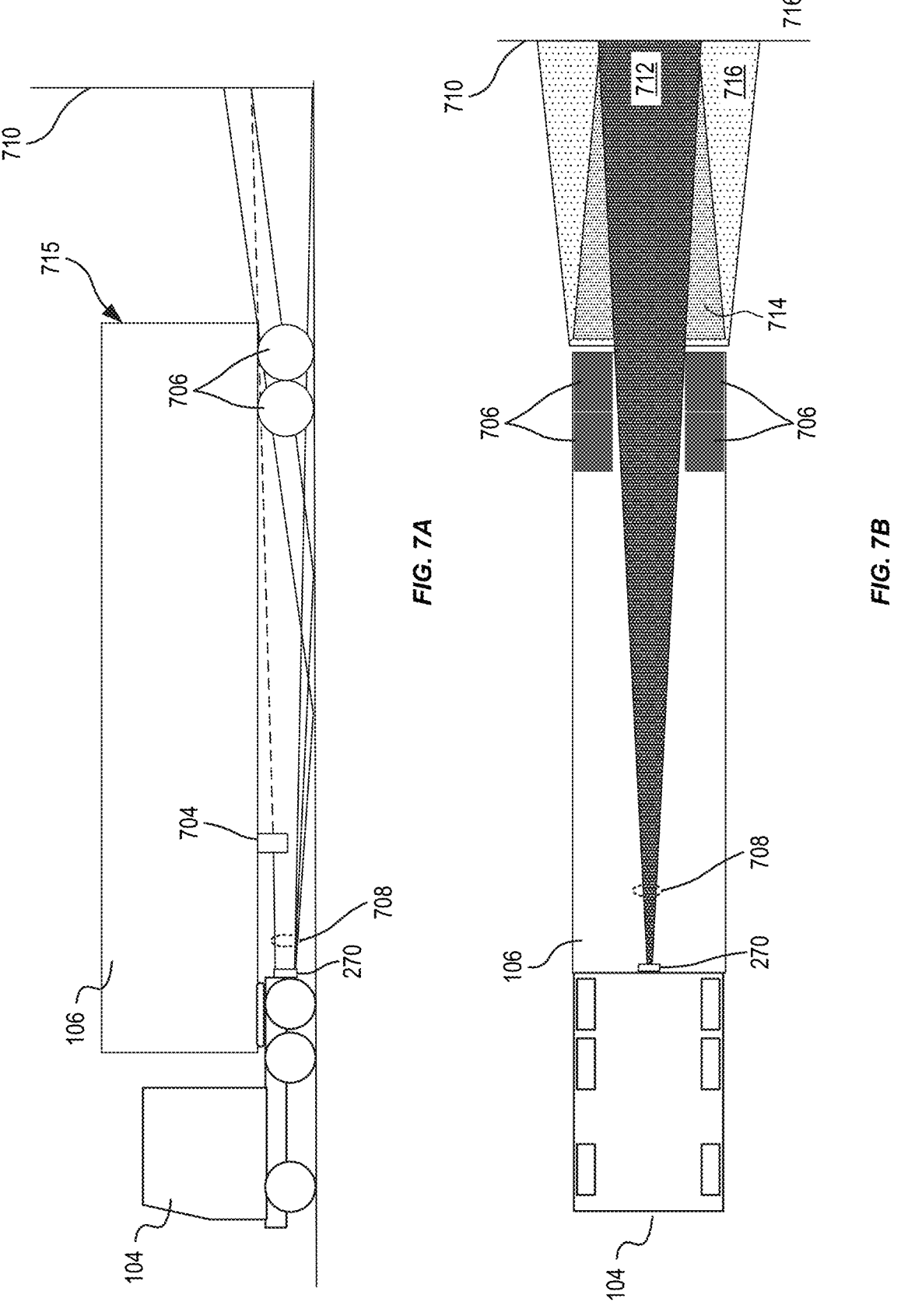
FIG. 7A is a side-view schematic showing example propagation of radio waves from the rear facing RADAR device of the tractor beneath the trailer, in embodiments.
FIG. 7B is a plan-view schematic showing the example propagation of radio waves from the rear facing RADAR device of the tractor beneath the trailer of FIG. 7A, in embodiments.

FIG. 7A is a side-view schematic showing example propagation of radio waves (RADAR beams, also referred to as RADAR signals) from the rear facing RADAR device 270 of tractor 104 beneath trailer 106. FIG. 7B is a plan-view schematic showing the example propagation of radio waves from the rear facing RADAR device 270 of tractor 104 beneath trailer 106 of FIG. 7A. FIGS. 7A and 7B are best viewed together with the following description. RADAR device 270 is attached to a back end of tractor 104 and faces beneath trailer 106. In embodiments, RADAR device 270 is a phased array, multiple transmit, multiple receive (MIMO) RADAR device (also known as digitally modulated RADAR) having a forty-degree vertical field of view and operating in the 77-80 Ghz band to provide 4-dimensional point cloud (4th dimension representing velocity of the measured point). RADAR device 270 may represent one of the HM11 Radar-on-a-chip devices from Uhnder, Inc. and the Eagle device from Oculii. For example, RADAR device 270 may have an Azimuth resolution of 0.8 degrees, an Elevation resolution of 0.8 degrees, a range resolution of 5 cm (Occuli) or 10 cm (uhnder), and a velocity resolution of 0.27 m/second.

RADAR device 270 emits multiple radio wave transmitted signals 708 (e.g., a scanning RADAR beam) beneath trailer 106, and detects RADAR return signal(s) resulting from the transmitted signals 708, or reflections thereof, reflecting off objects in the path of transmitted signals 708. Each scan may generate a corresponding RADAR point cloud 271 (see FIG. 2) that includes the corresponding RADAR return signal(s). These returns may result from structure forming the underside of trailer 106 and other objects there beyond. As shown in FIG. 7A, underhanging objects, such as landing gear 704, rear wheels 706, and other infrastructure (bogies, mud flaps, etc.) and ground-based structures may reflect and thus block certain ones of transmitted signals, however, other of transmitted signals 708 may emerge behind trailer 106. Some transmitted signals may be unimpeded and emerge from the rear of trailer 106. Some transmitted signals 708 may bounce off the ground and then emerge from the rear of trailer 106. For example, as shown in FIG. 7A, after bouncing off the ground, certain transmitted signals 708 may then pass between wheels 706 and emerge behind trailer 106. Other transmitted signals may bound of the underside of the trailer and emerge behind the trailer. Accordingly, some emerging transmitted signals 708 are direct, and other emerging transmitted signals are reflected off the ground and/or the underside of trailer 106.

As noted above, conventional RADAR devices are configured to reject and/or ignore multi-path reflections, since these multi-path reflections are typically unwanted noise that confuses perception of direct reflections. However, the present embodiments advantageously capture and use multi-path reflections to detect objects behind trailer 106 that would otherwise be undetectable. As shown in FIG. 7B, transmitted signals 712 that pass beneath trailer 106 to reach the area behind trailer 106 are reflected from the loading dock wall 710 back towards trailer 106 as reflected signals 714 (a.k.a., "return signals"). At least some of reflected signal 714 are reflected by a back end 715 of trailer 106, shown as double-reflected signals 716, back towards the loading dock wall 710 and so on. Advantageously, these signals 712, 714, and 716 indicate similar patterns of reflection that may be correlated as obstacle locations. For example, certain groupings in a linear pattern parallel to the back of the trailer may be used to determine the location of the dock wall relative to the RADAR device 270. Accordingly, RADAR device 270 generates a list of received reflections (e.g., range/azimuth/elevation/velocity of the returned energy) that may be used to detect obstacles hidden behind trailer 106.

It is further noted that, as shown in FIG. 7A, the vertical FOV of RADAR device 270 is restricted by trailer 106, and that the effect of any such vertical component on the indicated and/or corrected distance is negligible, and therefore the vertical component of the RADAR returns is ignored.

Figure 8:
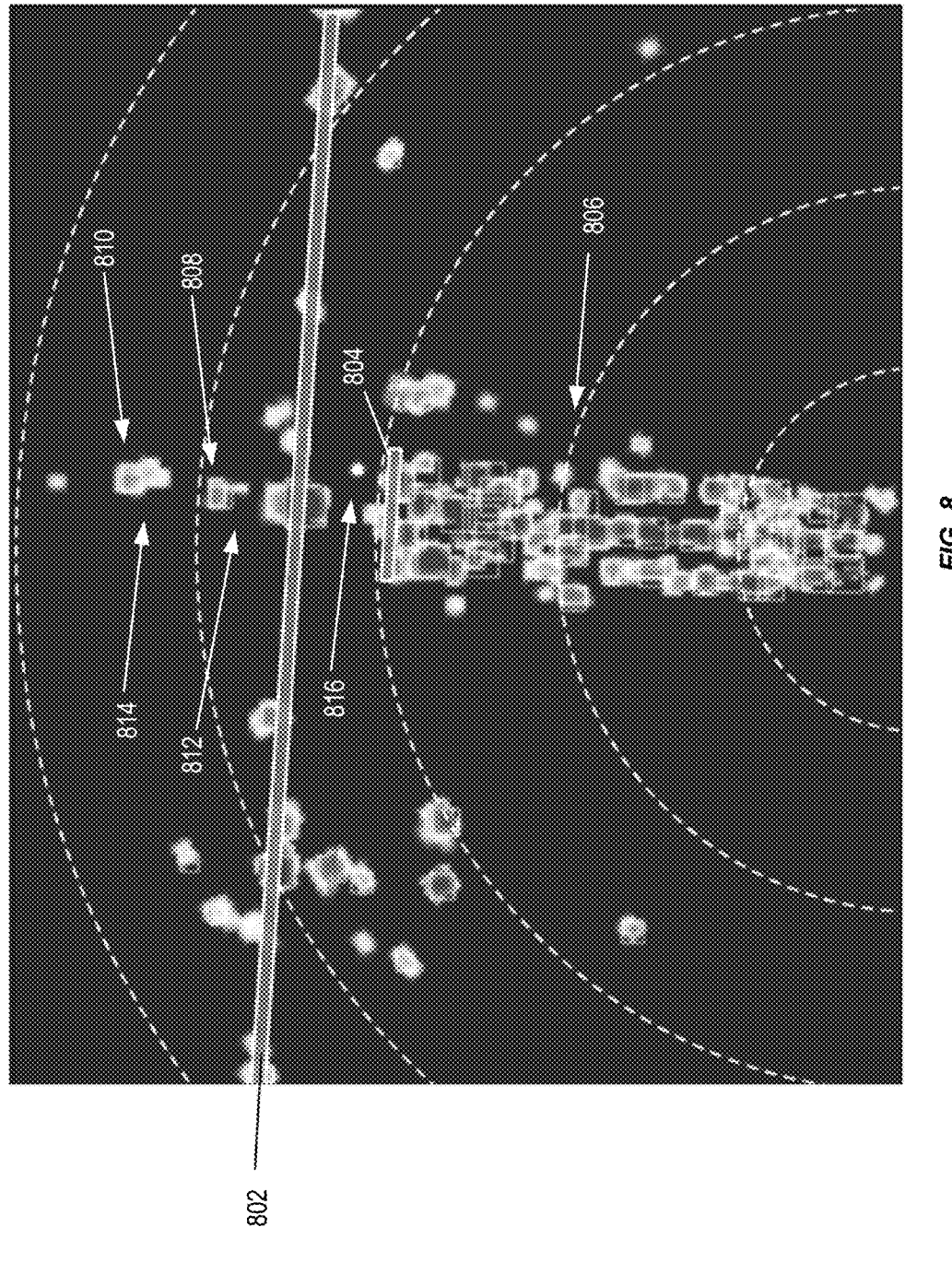
FIG. 8 shows a 2D representation of example RADAR returns detected by the RADAR device of FIG. 2, in embodiments.

FIG. 8 shows a 2D representation 800 of example RADAR returns detected by RADAR device 270 of FIG. 2. 2D representation 800 indicates RADAR returns as dots having a size and/or color representing the intensity of the detected return, and where the position of the dot within the 2D representation 800 indicates the presumed location of the object reflecting the RADAR signal and is based on the direction and time of the detected RADAR return signal. In the example of FIG. 8, the obstacle is positioned behind the wheels of trailer 106 and is not impinged by the direct beam of transmitted signals 712; however, the obstacle is impinged by both the reflected signals 714 and 716.

In the example of FIG. 8, 2D representation 800 shows line representing a dock wall 802 (e.g., a wall of loading dock 432). The line representing a dock wall 802 may be determined from one or more other sources such as LIDAR point cloud 221, mapped structures within yard 100, and/or RADAR returns defining a consistent pattern (or groupings) corresponding to a potential dock wall (e.g., the pattern is at the same location as the dock wall defined in LIDAR and/or mapped structures (GPS data)). 2D representation 800 also shows a line representing a trailer face 804 (e.g., a back end of trailer 106). The lines for dock wall 802 and trailer face 804 are shown for illustration purposes and may be defined and/or stored elsewhere. 2D representation 800 also shows many returns 806 from beneath trailer 106.

2D representation 800 also shows a return 808 corresponding to a first reflection of trailer 106 from dock wall 802, and a return 810 corresponding to a second reflection of dock wall 802 off trailer face 804 off dock wall 802. As appreciated, return 808 appears at a first distance beyond dock wall 802, where the first distance is equal to the distance between trailer face 804 and dock wall 802. Similarly, return 810 appears at twice the first distance beyond dock wall 802. Understanding of relationships between these reflections and returns allows other returns to be identified, particularly where the returns that appear behind location of a dock wall are only there because they are reflected return signals because the dock wall would otherwise prevent the RADAR transmitted signals from transmitting past the dock wall with sufficient signal strength. As seen in 2D representation 800, a weak obstacle return 812 appears near return 808 and corresponds to an obstacle positioned at the edge (e.g., at an edge of a virtual FOV) of reflected signals 714, and a strong obstacle return 814 appears near return 810 and corresponds to the obstacle reflecting double-reflected signals 716. That is, the obstacle was positioned behind trailer 106 such that no direct transmitted signals 708 impinged upon it, and therefore there was no direct return (e.g., a single reflected return signal) but as the RADAR continued to bounce back-and-forth, signals reflected off the obstacle were detectable by the device 270. By understanding the multiple reflections of RADAR signals between dock wall 802 and trailer face 804 (e.g., back end 715 of trailer 106), return signals detected by RADAR device 270 may be processed to detect obstacles behind trailer 106 that are otherwise not visible to camera or LIDAR-based obstacle detection systems because they are not visible due to the trailer, or wheels, or other obstacles blocking line-of-site between the camera/LIDAR and the potential obstacle.

Discriminating one obstacle from another using radar returns is based on determined contrast between the returns. The contrast is a characteristic of the detected signal and may be based upon one or both of spatial contrast, such as range/azimuth/elevation of the returned energy, and contrast in some measured property, such as velocity and/or signal intensity. Thus, the terms "weak" and "strong" as used herein refers to relative contrast in signal characteristic between two detected RADAR signals.

Figure 9:
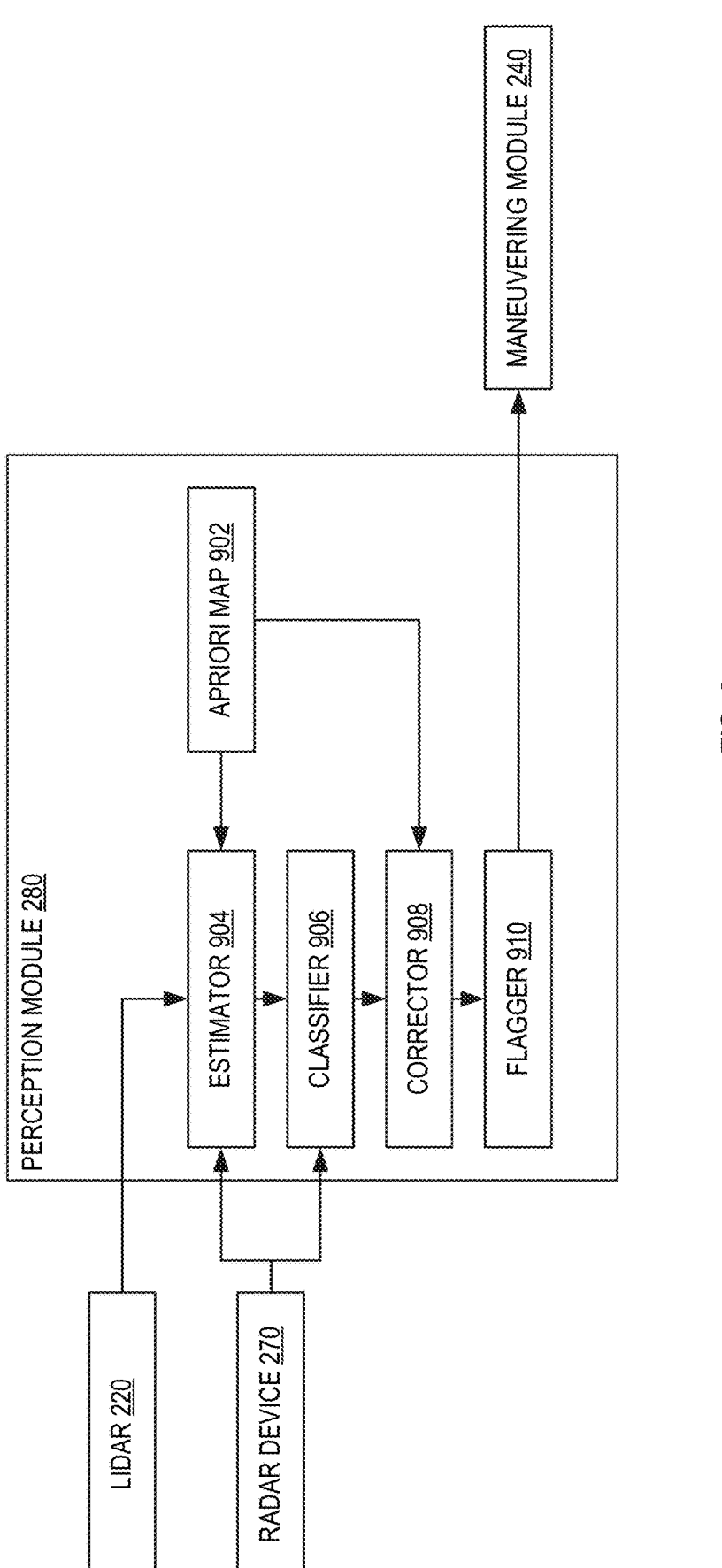
FIG. 9 is a block diagram illustrating the perception module of FIG. 2 in further example detail, in embodiments.

FIG. 9 is a block diagram illustrating perception module 280 of FIG. 2 in further example detail. Perception module 280 may be computer readable instructions that, when executed by a processor, implement the following functionality. Perception module 280 receives input defining detected returns at RADAR device 270 and may receive input from LIDAR 220, or other yard-mapping component. For example, processed data from LIDAR 220 may define structures (e.g., a wall of loading dock 432) detected around tractor 104. As another example, a yard may be mapped such that the location of structures within the yard are known. Processed data corresponding to the mapped yard, either stored on-board the tractor 104 in memory or retrieved via connection with mission controller 102 or other yard management server, may define structures (e.g., a wall of loading dock 432) in proximity to the tractor's 104 known location. An estimator 904 of perception module 280 receives RADAR returns from RADAR device 270, the mapping information on detected structures (e.g., from LIDAR 220, and/or an a priori map 902 defining structure within yard 100), and thereby estimates an expected position of dock wall 802 within the RADAR returns. That is, estimator 904 may correlate RADAR returns with other data defining expected structure to determine dock wall 802.

A classifier 906 of perception module 280 receives the estimated location of dock wall 802 from estimator 904 and classifies RADAR returns from RADAR device 270 based on whether they are direct returns (e.g., positioned at or before dock wall 802), a first bounce return (e.g., positioned beyond dock wall 802 but before return 808 and thus from reflected signals 714), a second bounce return (e.g., positioned beyond return 808 and thus from double-reflected signals 716), etc.

In certain embodiments, classifier 906 may also use velocity property of each RADAR return for classification. Velocity of each return is provided by RADAR device 270 and may be used to further distinguish and/or classify each RADAR return. The speed of tractor 104 may be provided to perception module 280. Since trailer 106 is moving towards loading dock 432 under control of tractor 104, relative to RADAR device 270, the wall of loading dock 432 appears to be moving at the speed of trailer 106, which appears stationary relative to RADAR device 270. Since the wall of loading dock 432 and the trailer face (e.g., the rear end of trailer 106) are near parallel, each reflection resulting from the RADAR transmitted signal 708 bouncing off of an obstacle multiplies the measured velocity. The reported RADAR returns each define a direct measurement of radial velocity, relative to RADAR device 270, of the reflecting object. Accordingly, a RADAR return based on a single reflection of transmitted signal 712 reports a true velocity of the reflecting object relative to RADAR device 270, whereas a RADAR return from a double-reflection (e.g. a reflection based on reflected signal 714) reports double the true radial velocity, and a RADAR return a triple-reflection (e.g., based on signal 716) reports triple the true radial velocity, and so on. The reflected trailer face 804 appears to be moving at twice the speed of the dock wall 802. Advantageously, classifier 906 may use the velocity of each RADAR return to further classify and/or to verify the classification of each RADAR return. As tractor 104 and trailer 106 are reversing, the velocity component of stationary objects directly relates to the speed of tractor 104. Accordingly, RADAR returns may be classified based on indicated velocity to identify stationary structure and objects. That is, RADAR returns that do not have a velocity component directly related to the speed of tractor 104 cannot indicate a stationary object or structure. Accordingly, RADAR returns with a velocity component that does not relate to the velocity of tractor 104 indicate a moving object that may be flagged.

A corrector 908 of perception module 280 processes the classified RADAR returns output by classifier 906 to determine obstacles (e.g., objects other than dock wall 802 and trailer face 804) that are located behind trailer 106 (e.g., between trailer 106 and the wall of loading dock 432) by correcting the perceived obstacle distance based on whether the RADAR return signal resulted from a reflection of the RADAR beam. The lateral component of the RADAR return is not corrected or adjusted. In one example of operation, corrector 908 identifies returns 812 and 814 as representing an obstacle positioned between trailer 106 and the wall of loading dock 432 by correcting the indicated distance RADAR return signals 812 and 814 based upon a number of reflections for each RADAR return signal. Accordingly, corrector 908 determines a corrected location (shown as point 816 in FIG. 8) of the obstacle and send the corrected location of the obstacle to a flagger 910 of perception module 280. That is, corrector 908 determines the correct location of the obstacle by correcting the distance according to the reflections of the RADAR signal. As shown in FIG. 8, both returns 812 and 814 have reported locations that are beyond dock wall 802, which is a result of the RADAR signal being reflected before impinging upon the obstacle. Accordingly, corrector 908 adjusts the perceived distance to an actual location 816 by removing the distance added by the reflection(s).

Flagger 910 flags the detected obstacle with a corresponding corrected location and stores the detected obstacle 281 with corresponding location in memory 210. The flagged obstacle 281 may be used by maneuvering module 240 to alter, stop, or otherwise maneuver the trailer to avoid obstacle 281. In certain embodiments, Flagger 910 may evaluate each detected obstacle and corresponding corrected location against planned motion of tractor 104 and trailer 106 to determine whether the obstacles are in the path of trailer 106 and does not flag obstacles having corrected locations that are not in the path of trailer 106.

In certain embodiments, where trailer 106 is not being reversed up to a dock wall (e.g., where there are no flat structures positioned behind trailer 106), perception module 280 cannot detect dock wall 802 and may thereby determine that obstacles may be detected only by direct beam of transmitted signals 712, since there is no dock wall to reflect transmitted signal 712 to generate signals 714 and 716. Accordingly, perception module 280 may generate an alert (e.g., to an operator of tractor 104) to indicate that operation of RADAR device 270 is limited to a narrower FOV behind trailer.

In certain embodiments, where perception module 280 fails to detect sufficient RADAR returns beyond trailer face 804 (e.g., the known end of trailer 106), perception module 280 may determine that object detection is not possible since substantially all of signals 708 are blocked by structure beneath trailer 106. Such determination may prevent a sense of false safety and/or false security. In one example, when sufficient RADAR returns beyond trailer face 804 are not detected, flagger 910 may alert maneuvering module 240 and/or an operator.

Figure 10:
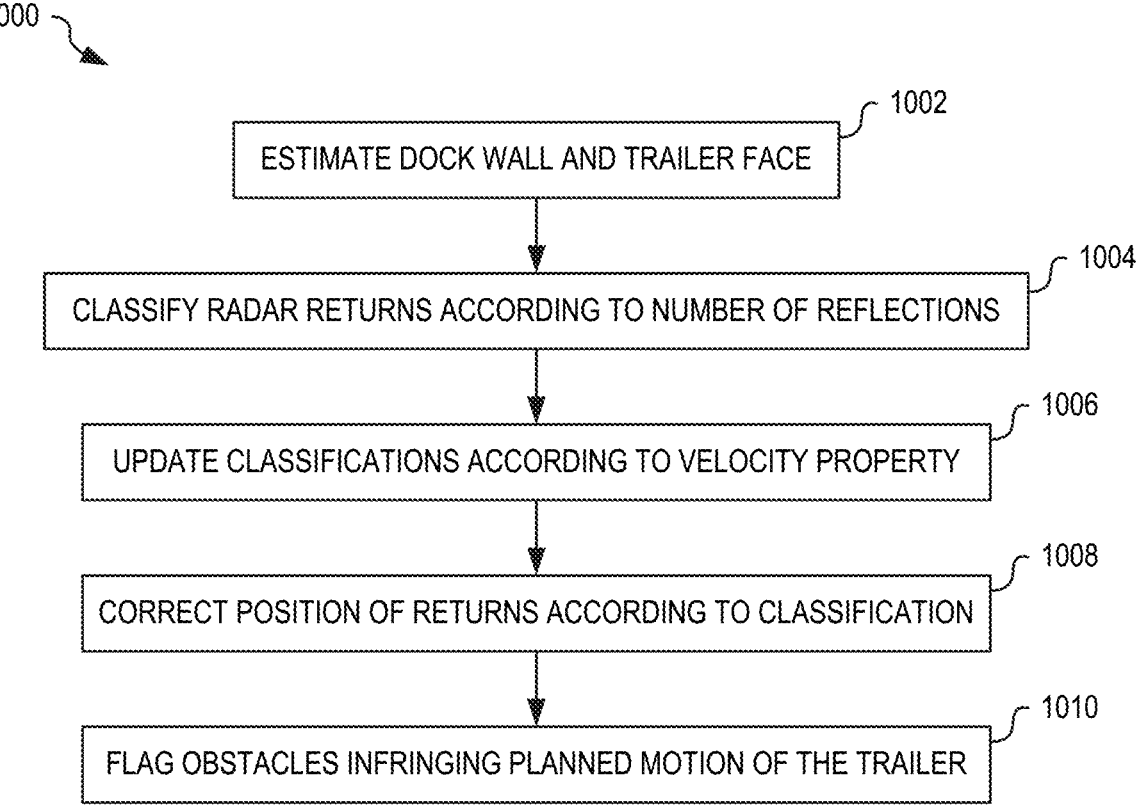
FIG. 10 is a flowchart illustrating one example RADAR method for backing a trailer, in embodiments.

FIG. 10 is a flowchart illustrating one example RADAR method 1000 for backing a trailer. Method 1000 may be implemented using perception module 280 of controller 206 within tractor 104. In block 1002, method 1000 estimates a dock wall and trailer face. In one example of block 1002, estimator 904 correlates RADAR returns with other data, received from LIDAR 220 and a priori map 902 defining structure of yard 100, to determine dock wall 802 and trailer face 804.

In block 1004, method 1000 classifies the radar returns according to number of reflections. In one example of block 1004, classifier 906 receives the estimated location of dock wall 802 and trailer face 804 from estimator 904 and classifies RADAR returns based on whether they are direct returns, a first bounce return, and a second bounce return. In block 1006, method 1000 updates the classifications according to a velocity property. In one example of block 1006, classifier 906 uses the velocity of each RADAR return to further classify, and/or to verify, the classification of each RADAR return.

In block 1008, method 1000 corrects the position of returns according to the classification. In one example of block 1008, corrector 908 processes the classified RADAR returns output by classifier 906 to identify objects other than dock wall 802 and trailer face 804 that are behind trailer 106 (e.g., between trailer 106 and the wall of loading dock 432) and to determine the actual position of the object by correcting the perceived location based upon whether the RADAR return was from a direct transmitted signal 712, a reflected signal 714, or a double-reflected signal 716.

In block 1010, method 1000 flags obstacles based on planned motion of the trailer. In one example of block 1010, flagger 910 evaluates each detected obstacle and its corresponding corrected location against planned motion of tractor 104 and trailer 106 to determine whether the obstacles is in the path of trailer 106 and does not flag obstacles having corrected locations that are not in the path of trailer 106. Method 1000 repeats for each new set of RADAR returns captured by RADAR device 270.

Although RADAR device 270 generates a 3D point cloud 271, perception module 280, in one embodiment, may process only certain RADAR returns that fall within a horizontal range corresponding to the height of trailer 106 or below.

Figure 11A:
FIG. 11A shows one example 2D representation of example RADAR returns detected by the RADAR device of FIG. 2 when no obstacle is behind the trailer, in embodiments.

FIG. 11A shows one example 2D representation 1100 of example RADAR returns detected by RADAR device 270 of FIG. 2 when no obstacle is behind trailer 106. FIG. 11B shows one example 2D representation 1150 of example RADAR returns detected by RADAR device 270 of FIG. 2 when an obstacle is location behind trailer 106. FIGS. 11A and 11B are shown in line drawings here having different shapes (e.g., squares, diamonds, triangles, stars for different characteristics of the radar return. It should be appreciated, however, that a given representation may be in colors instead of different shapes, such as the heat map of FIG. 8, or as FIGS. 11A and B were shown in U.S. Provisional Patent Application Ser. No. 63/289,610, filed Dec. 14, 2021, and incorporated by reference here.

Similar to 2D representation 800 of FIG. 8, 2D representations 1100 and 1150 both show a line representing a dock wall 1102 (e.g., a wall of loading dock 432), a line representing a trailer face 1104 (e.g., a back end of trailer 106), and a line corresponding to a first reflection 1106 of trailer face 1104 from dock wall 1102. FIG. 11B further shows a direct RADAR return 1152 (e.g., received from transmitted signals 712) corresponding to the obstacle, and a RADAR return 1154 (e.g., received from double-reflected signal 714)

corresponding to a first reflection of the obstacle. Accordingly, flagger 910 flags the RADAR returns 1152 and 1154 as an obstacle because they are located in an area in the 2D representation that is behind the dock wall (and thus shouldn't be visible to the RADAR). Flagger 910 may store the obstacle 281 in memory 210 and notifies maneuvering module 240 accordingly.

Figure 12:
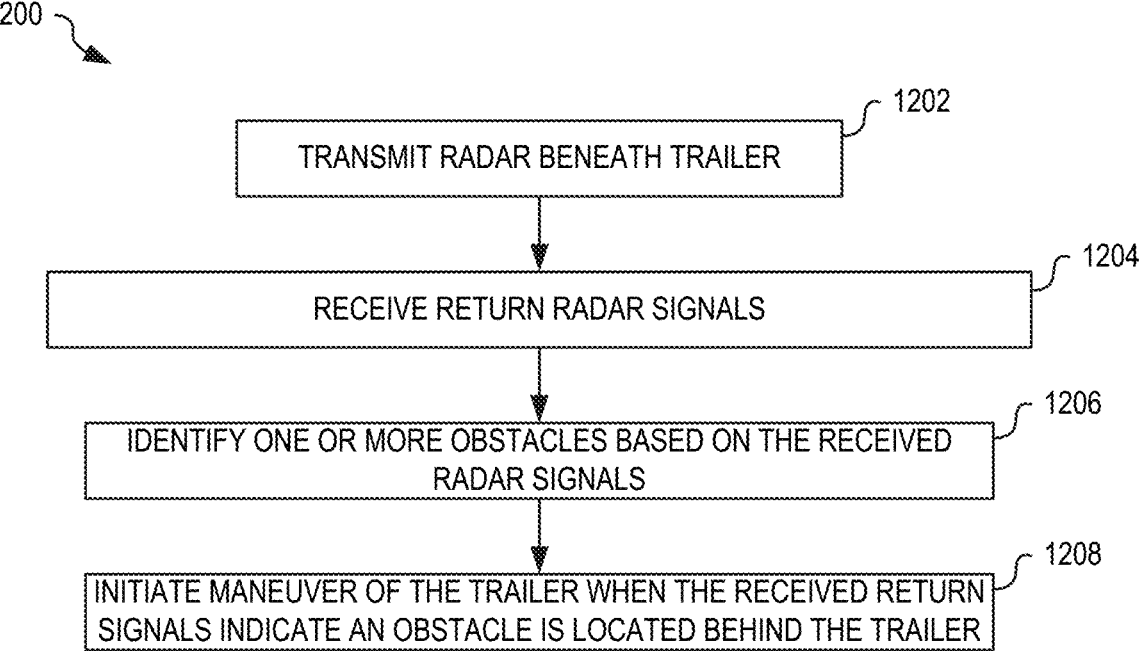
FIG. 12 is a flowchart illustrating one example method for maneuvering a trailer, in embodiments.

FIG. 12 is a flowchart illustrating one example method 1200 for maneuvering a trailer. Method 1200 is, for example, implemented by the computer readable instructions that, when executed by processor 208 implement the controller 206 of FIG. 2. Method 1200 is, in at least some embodiments, implemented in combination with method 500, 1000 or other functionality and methods disclosed herein.

Block 1202 includes transmitting a radio detection and ranging (RADAR) transmitted signal beneath a trailer. In one example of block 1202, perception module 280 of controller 206 controls RADAR device 270 to generate at least one transmitted signal (e.g., transmitted signal 712 of FIGS. 7A, B).

Block 1204 includes receiving return RADAR signals based on the transmitted signal. In one example of block 1202, perception module 280 of controls RADAR device 270 to receive reflected signals based on the transmitted signal reflecting off of one or more objects at or behind the trailer.

Block 1206 includes processing the received return RADAR signals to identify at least one obstacle behind the trailer. In one example of block 1206, perception module 280 detects obstacles 281 using the received reflected signals. In an embodiment, the processing the received return RADAR signals including identifying a number of reflections of one or more of the received return RADAR signals, and any of the above-discussed functionality with respect to FIG. 9. In an embodiment, the processing of block 1206 includes generating a point cloud from the received return RADAR signals; comparing RADAR points in the point cloud to a location of a dock wall; and, identifying the at least one obstacle based on ones of the RADAR points corresponding to a location in the point cloud that is behind a location of the dock wall in the point cloud as shown and discussed above with respect to FIGS. 8 and 11A/B.

Block 1208 includes initiating a maneuver of the trailer when the received return RADAR signals indicate an obstacle is located behind the trailer. In one example of operation of block 1208, controller 206 implements the machine readable instructions implementing the maneuvering module 240 to control the tractor 104 to stop, change course, or otherwise maneuver based on location of the trailer with respect to location of obstacles 281 defined in memory 210.

CROSS-REFERENCE TO RELATED APPLICATIONS

Features described herein may be combined in many ways as understood by those of ordinary skill in the art. The following is a list of potential combination of elements but is not limiting. Other combination of features may be made without departing from the scope hereof.

(A1) In an embodiment of a first aspect, a system for backing a trailer comprises: a radio detection and ranging (RADAR) device adapted to mount on a tractor with a field-of-view (FOV) rearward of the tractor such that, when the tractor is coupled to the trailer, the FOV is under the trailer.

(A2) In the embodiment designated as (A1) of the first aspect, the system further includes a controller coupled to the RADAR device and operable to: control the RADAR device to transmit a plurality of transmitted signals within the FOV.

(A3) In either embodiment designated as (A1) or (A2) of the first aspect, the controller is further operable to: receive, from the RADAR device, at least one return signal being at least one reflection of at least one of the plurality of transmitted signals and corresponding to an obstacle behind the trailer, the return signal defining a perceived location of the obstacle.

(A4) In any embodiment designated as (A3) of the first aspect, the controller is further operable to: determine a correct location of the obstacle based on the perceived location and a number of reflections made by the return signal.

(A5) In any embodiment designated as (A3) through (A4) of the first aspect, the controller is further operable to: to determine the number of reflections based on a position of a dock wall and a trailer face relative to the RADAR device and the perceived location.

(A6) In any embodiment designated as (A5) of the first aspect, the controller is further operable to: the controller further operable to determine a location of the dock wall relative to the RADAR device based on a defined geographic location of the dock wall and a reported geographic location and orientation of the tractor.

(A7) In any embodiment designated as (A5) through (A6) of the first aspect, the controller is further operable to determine a location of the dock wall relative to the RADAR device based on received LIDAR data captured by LIDAR mounted to the tractor.

(A8) In any embodiment designated as (A5) through (A9) of the first aspect, the return signal defining the perceived location within a three-dimensional space relative to the RADAR device.

(A9) In any embodiment designated as (A5) through (A8) of the first aspect, the controller is further operable to determine a location of the dock wall relative to the RADAR device based on groupings of return signals.

(A10) In any embodiment designated as (A9) of the first aspect, the controller is further operable to correlate the groupings to a defined geographic location of the dock wall.

(A11) In any embodiment designated as (A10) of the first aspect, the controller is further operable to determine the defined geographic location of the dock wall based on one or more of image data, LIDAR data, and ultrasonic data received from at least one external sensor distinct from the RADAR device.

(A12) In any embodiment designated as (A1) through (A11) of the first aspect, the controller is further operable to correlate a linear grouping of return signals from the RADAR device to the dock wall.

(A13) In any embodiment designated as (A1) through (A11) of the first aspect, the controller further operable to correlate a linear grouping of return signals from the RADAR device to the trailer face of the trailer.

(A14) In any embodiment designated as (A1) through (A14) of the first aspect, the controller further operable to correlate the linear grouping of return signals to a location of a back end of the trailer defined by a trailer angle relative to the tractor and a current location and orientation of the tractor.

(A15) In any embodiment designated as (A1) through (A14) of the first aspect, the controller further operable to correlate multiple return signals to the obstacle.

(B1) In an embodiment of a second aspect, a method for backing a trailer includes: estimating a dock wall and a trailer face.

(B2) In the embodiment designated as (B1) of the second aspect, the method further includes classifying radio detection and ranging (RADAR) return signals according to a number of reflections of a corresponding RADAR transmitted signal.

(B3) In either embodiment designated as (B1) or (B2) of the second aspect, the method further includes updating classifications according to velocity property of the RADAR return signals.

(B4) In any embodiment designated as (B1) through (B3) of the second aspect, the method further includes correcting position of the RADAR return signals according to the classifications.

(B5) In any embodiment designated as (B1) through (B4) of the second aspect, the method further includes flagging obstacles positioned behind the trailer based upon the corrected position of the RADAR return signals.

(B6) In any embodiment designated as (B1) through (B5) of the second aspect, the step of estimating the dock wall includes determining the location of the dock wall from a defined geographic location of the dock wall.

(B7) In any embodiment designated as (B1) through (B6) of the second aspect, the step of classifying the RADAR return signals includes determining the number of reflections is zero when the perceived location is positioned at or before the dock wall, the number of reflections is one when the perceived location is positioned beyond the dock wall less than a distance between the dock wall and the trailer face, and the number of reflections is two when the perceived location is positioned beyond the dock wall more than the distance between the dock wall and the trailer face.

(B8) In any embodiment designated as (B1) through (B7) of the second aspect, the step of classifying the RADAR return signals comprising determining the number of reflections is zero when a first velocity defined by the RADAR return signals is equal to a second velocity of the tractor, the number of reflections is one when the first velocity defined by the RADAR return signals is greater than the second velocity of the tractor and less than twice the second velocity of the tractor, and the number of reflections is two when the first velocity defined by the RADAR return signals is greater than twice the second velocity of the tractor and less than thrice the second velocity of the tractor.

(B9) In any embodiment designated as (B1) through (B8) of the second aspect, the method is implemented on any embodiment designated as (A1) through (A15).

(C1) In an embodiment of a third aspect, a method for maneuvering a trailer, includes: transmitting a radio detection and ranging (RADAR) transmitted signal beneath the trailer.

(C2) In the embodiment designated as (C1) of the third aspect, the method further includes receiving return RADAR signals based on the transmitted signal.

(C3) In either embodiment designated as (C1) or (C2) of the third aspect, the method further includes processing the return RADAR signals to identify at least one obstacle behind the trailer.

(C4) In any embodiment designated as (C1) through (C3) of the third aspect, the method further includes initiating a maneuver of the trailer when the return RADAR signals indicate an obstacle is located behind the trailer.

(C5) In any embodiment designated as (C1) through (C4) of the third aspect, the processing the return RADAR signals includes identifying a number of reflections of one or more of the return RADAR signals.

(C6) In any embodiment designated as (C1) through (C5) of the third aspect, the processing includes: generating a point cloud from the return RADAR signals.

(C7) In any embodiment designated as (C6) of the third aspect, the processing includes: comparing RADAR points in the point cloud to a location of a dock wall.

(C8) In any embodiment designated as (C6) through (C7) of the third aspect, the processing includes: identifying the at least one obstacle based on ones of the RADAR points corresponding to a location in the point cloud that is behind the location of the dock wall in the point cloud.

(C9) In any embodiment designated as (C1) through (C8) of the third aspect, the processing includes: identifying the dock wall in the point cloud based on a linear grouping of the RADAR points in the point cloud.

(C10) In any embodiment designated as (C1) through (C9) of the third aspect, the method further comprising receiving position of the dock wall as defined using a LIDAR or defined in a yard-map.

(C11) In any embodiment designated as (C10) of the third aspect, the processing includes correlating the position of the dock wall to the point cloud.

(C12) In any embodiment designated as (C1) through (C11) of the third aspect, the initiating a maneuver includes autonomously controlling an autonomous yard vehicle coupled to the trailer.

(C13) In any embodiment designated as (C1) through (C12) of the second aspect, the method is implemented on any embodiment designated as (A1) through (A15).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for backing a trailer, comprising:
a radio detection and ranging (RADAR) device adapted to mount on a tractor with a field-of-view (FOV) rearward of the tractor such that, when the tractor is coupled to the trailer, the FOV is under the trailer; and
a controller coupled to the RADAR device and operable to:
control the RADAR device to transmit a plurality of transmitted signals within the FOV,
receive, from the RADAR device, at least one return signal being at least one reflection of at least one of the plurality of transmitted signals and corresponding to an obstacle behind the trailer, the return signal defining a perceived location of the obstacle,
classify the at least one return signal, the classify the at least one return signal comprising:
determining a number of reflections as a direct return when the perceived location is positioned at or before a dock wall,
determining the number of reflections as a first bounce return when the perceived location is positioned beyond the dock wall less than a distance between the dock wall and a trailer face, and
determining the number of reflections as a second bounce return when the perceived location is positioned beyond the dock wall more than the distance between the dock wall and the trailer face; and determine a correct location of the obstacle based on the perceived location and the number of reflections made by the return signal.

2. The system of claim 1, the controller further operable to determine a location of the dock wall relative to the RADAR device based on a defined geographic location of the dock wall and a reported geographic location and orientation of the tractor.

3. The system of claim 1, the controller further operable to determine a location of the dock wall relative to the RADAR device based on received LIDAR data captured by LIDAR mounted to the tractor.

4. The system of claim 1, the return signal defining the perceived location within a three-dimensional space relative to the RADAR device.

5. The system of claim 1, the controller further operable to determine a location of the dock wall relative to the RADAR device based on groupings of return signals.

6. The system of claim 5, the controller further operable to correlate the groupings to a defined geographic location of the dock wall.

7. The system of claim 6, the controller further operable to determine the defined geographic location of the dock wall based on one or more of image data, LIDAR data, and ultrasonic data received from at least one external sensor distinct from the RADAR device.

8. The system of claim 5, the controller further operable to correlate a linear grouping of return signals from the RADAR device to the dock wall.

9. The system of claim 5, the controller further operable to correlate a linear grouping of return signals from the RADAR device to the trailer face of the trailer.

10. The system of claim 9, the controller further operable to correlate the linear grouping of return signals to a location of a back end of the trailer defined by a trailer angle relative to the tractor and a current location and orientation of the tractor.

11. The system of claim 5, the controller further operable to correlate multiple return signals to the obstacle.

12. A method for backing a trailer, comprising:
estimating a dock wall and a trailer face;
determining classifications by classifying radio detection and ranging (RADAR) return signals according to a number of reflections of a corresponding RADAR transmitted and reflected off of a dock wall, the number of reflections being identified based on a position of the dock wall and a trailer face relative to a RADAR device and a perceived location of an obstacle represented in the RADAR return signals, the classifying the RADAR return signals comprising:
determining the number of reflections as a direct return when a first velocity defined by the RADAR return signals is equal to a second velocity of a tractor,
determining the number of reflections as a first bounce return when the first velocity defined by the RADAR return signals is greater than the second velocity of the tractor and less than twice the second velocity of a tractor, and
determining the number of reflections as a second bounce return when the first velocity defined by the RADAR return signals is greater than twice the second velocity of the tractor and less than thrice the second velocity of the tractor;
correcting position of the RADAR return signals according to the classifications; and flagging the obstacle positioned behind the trailer based upon the corrected position of the RADAR return signals.

13. The method of claim 12, the step of estimating the dock wall comprising determining the location of the dock wall from a defined geographic location of the dock wall.

14. The method of claim 12, the step of classifying the RADAR return signals comprising determining the number of reflections as direct when the perceived location is positioned at or before the dock wall, the number of reflections as direct plus one when the perceived location is positioned beyond the dock wall less than a distance between the dock wall and the trailer face, and the number of reflections as direct plus at least two when the perceived location is positioned beyond the dock wall more than the distance between the dock wall and the trailer face.

15. The method of claim 12, the step of classifying the RADAR return signals comprising determining the number of reflections as direct when a first velocity defined by the RADAR return signals is equal to a second velocity of the tractor, the number of reflections as direct plus one when the first velocity defined by the RADAR return signals is greater than the second velocity of the tractor and less than twice the second velocity of the tractor, and the number of reflections as direct plus at least two when the first velocity defined by the RADAR return signals is greater than twice the second velocity of the tractor and less than thrice the second velocity of the tractor.

16. A method for maneuvering a trailer, comprising:
transmitting a radio detection and ranging (RADAR) transmitted signal beneath the trailer;
receiving return RADAR signals based on the transmitted signal;
processing the return RADAR signals to identify at least one obstacle behind the trailer, the processing the return RADAR signals including classifying the return RADAR signals, the classifying comprising:
determining a number of reflections as a direct return when a perceived location of the at least one obstacle is positioned at or before a dock wall,
determining the number of reflections as a first bounce return when the perceived location is positioned beyond the dock wall less than a distance between the dock wall and a trailer face, and
determining the number of reflections as a second bounce return when the perceived location is positioned beyond the dock wall more than the distance between the dock wall and the trailer face; and
initiating a maneuver of the trailer when the return RADAR signals indicate an obstacle is located behind the trailer.

17. The method of claim 16, the processing including:
generating a point cloud from the return RADAR signals;
comparing RADAR points in the point cloud to a location of a dock wall; and
identifying the at least one obstacle based on ones of the RADAR points corresponding to a location in the point cloud that is behind the location of the dock wall in the point cloud.

18. The method of claim 17, the processing further including identifying the dock wall in the point cloud based on a linear grouping of the RADAR points in the point cloud.

19. The method of claim 17, further comprising receiving position of the dock wall as defined using a LIDAR or defined in a yard-map; the processing further comprising correlating the position of the dock wall to the point cloud.

20. The method of claim 16, the initiating a maneuver including autonomously controlling an autonomous yard vehicle coupled to the trailer.

\* \* \* \* \*